(12) United States Patent
Ehren

(10) Patent No.: US 11,708,278 B2
(45) Date of Patent: **\*Jul. 25, 2023**

(54) PRODUCTION OF LITHIUM HYDROXIDE AND LITHIUM CARBONATE

(71) Applicant: Lithium Ark Holding B.V., Voorschoten (NL)

(72) Inventor: Peter Ehren, La Serena (CL)

(73) Assignee: Lithium Ark Holding B.V., Voorschoten (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,647

(22) Filed: Apr. 8, 2022

(65) Prior Publication Data
US 2023/0040988 A1 Feb. 9, 2023

Related U.S. Application Data

(63) Continuation of application No. 17/395,457, filed on Aug. 6, 2021, now Pat. No. 11,339,481.

(51) Int. Cl.
| | | |
|---|---|---|
| *C01D 1/20* | (2006.01) |
| *C01D 15/02* | (2006.01) |
| *C01D 15/08* | (2006.01) |
| *C01B 7/01* | (2006.01) |
| *B01D 9/00* | (2006.01) |
| *B01D 21/00* | (2006.01) |
| *C25B 1/46* | (2006.01) |
| *C25B 15/08* | (2006.01) |
| *B01D 21/26* | (2006.01) |

(52) U.S. Cl.
CPC ............. *C01D 1/20* (2013.01); *B01D 9/0031* (2013.01); *B01D 21/0012* (2013.01); *B01D 21/262* (2013.01); *C01B 7/012* (2013.01); *C01D 15/02* (2013.01); *C01D 15/08* (2013.01); *C25B 1/46* (2013.01); *C25B 15/081* (2021.01); *C25B 15/083* (2021.01); *C01P 2006/80* (2013.01)

(58) Field of Classification Search
CPC .................................. C01D 1/20; C01D 15/02
See application file for complete search history.

(56) References Cited

U.S. PATENT DOCUMENTS 4,253,923 A    3/1981    Lynch et al.

FOREIGN PATENT DOCUMENTS

| CN | 205856014 | | 1/2017 | |
| CN | 109516479 A | * | 3/2019 | ............. C01D 15/02 |

(Continued)

OTHER PUBLICATIONS

CN-109516479-A translation (Year: 2019).*

(Continued)

*Primary Examiner* — Nicholas A Smith
(74) *Attorney, Agent, or Firm* — Schneer IP Law PLLC

(57) ABSTRACT

Methods and systems for production of lithium hydroxide and lithium carbonate are described. One or more embodiments of the method include producing lithium hydroxide from potassium chloride, lithium chloride, and water. One or more embodiments of the method include producing lithium carbonate from potassium chloride, lithium chloride, water, and a carbon dioxide source. One or more embodiments of the method include producing lithium carbonate from sodium chloride, lithium chloride, water, and a carbon dioxide source.

20 Claims, 17 Drawing Sheets

(56) References Cited

FOREIGN PATENT DOCUMENTS

| CN | 109592699 | 4/2019 | |
|----|-----------|--------|---|
| EP | 0013309 | 7/1980 | |
| EP | 0021624 | 1/1981 | |
| EP | 3800163 | 4/2021 | |
| JP | 2004149376 | 5/2004 | |
| WO | 2016/070217 | 5/2016 | |
| WO | WO-2021228936 A1 * | 11/2021 | ............. C01D 15/04 |
| WO | 2022/147632 | 7/2022 | |

OTHER PUBLICATIONS

Lithium and Lithium Compounds, Ulrich Wietelmann, Chemetall GmbH, Frankfort, Federal Republic of Germany Richard J. Bader, Chemetall GmbH, Frankfurt, Federal Republic of Germany, Ullmann's Encyclopedia of Industrial Chemistry, 2012.

* cited by examiner

1100
Electrolyze a Potassium Chloride Solution to Obtain a Potassium Hydroxide Solution, a Depleted Potassium Chloride Solution, Chlorine Gas, and Hydrogen Gas 1105
React the Potassium Hydroxide Solution with a Carbon Dioxide Source to form a Potassium Carbonate Solution 1110
React the Potassium Carbonate Solution with a Lithium Chloride Solution to Obtain a Product Mixture Including Potassium Chloride, and Lithium Carbonate Solids

FIG. 11

PRODUCTION OF LITHIUM HYDROXIDE AND LITHIUM CARBONATE

FIELD

The field of the present disclosure relates generally to lithium production, and more specifically to production of lithium hydroxide and lithium carbonate.

BACKGROUND

Although lithium is widely distributed on Earth, there are few commercial sources where lithium is found in concentrated values suitable for producing lithium compounds, such as lithium carbonate and lithium hydroxide. These lithium compounds are in demand by several industries, including but not limited to the pharmaceutical and energy industries. One source of lithium is in minerals, such as, spodumene. Another source is from naturally occurring brines, such as those found in salars, salt lakes, salt mines and geothermal resources. Once the lithium is extracted and concentrated, conventional methods react a resulting lithium solution with one or more reagents to produce lithium hydroxide or lithium carbonate. However, these reagents, which may include lime, soda ash, hydrochloric acid, and sodium hydroxide, among others, can be expensive to obtain, and may contain noxious impurities. In addition, existing lithium hydroxide and lithium carbonate production processes can be inefficient, requiring improvement in waste reduction and material re-use. Accordingly, more cost-effective and efficient methods and systems for producing lithium hydroxide and lithium carbonate are needed.

SUMMARY

An exemplary method for production of lithium hydroxide is described. One or more embodiments of the method include electrolyzing a potassium chloride solution to obtain a potassium hydroxide solution, a depleted potassium chloride solution, chlorine gas, and hydrogen gas, reacting the potassium hydroxide solution with a lithium chloride solution to form a reciprocal salt system comprising potassium hydroxide, lithium chloride, potassium chloride, lithium hydroxide, and water, and precipitating the potassium chloride and the lithium hydroxide from the reciprocal salt system to form lithium hydroxide crystals and potassium chloride crystals.

An additional exemplary method for production of lithium hydroxide is described. One or more embodiments of the method include electrolyzing a potassium chloride solution to obtain a potassium hydroxide solution, a depleted potassium chloride solution, chlorine gas, and hydrogen gas, reacting the potassium hydroxide solution with a lithium chloride solution to form a reciprocal salt system comprising potassium hydroxide, lithium chloride, potassium chloride, lithium hydroxide and water, precipitating the potassium chloride and lithium hydroxide from the reciprocal salt system to form lithium hydroxide crystals and potassium chloride crystals, dissolving the potassium chloride crystals in water or the depleted potassium chloride solution and filtering a resulting mixture to obtain the potassium chloride solution, and repeating the electrolyzing, reacting, precipitating, and dissolving steps.

A further exemplary method for production of lithium hydroxide is described. One or more embodiments of the method include electrolyzing a potassium chloride solution to obtain a potassium hydroxide solution, a depleted potassium chloride solution, chlorine gas, and hydrogen gas, reacting the potassium hydroxide solution with a lithium chloride solution to form a reciprocal salt system comprising potassium hydroxide, lithium chloride, potassium chloride, lithium hydroxide and water, precipitating the potassium chloride and lithium hydroxide from the reciprocal salt system to form lithium hydroxide crystals, and potassium chloride crystals, and purifying the lithium hydroxide crystals.

An exemplary system for production of lithium hydroxide is described. One or more embodiments of the system include at least one electrolysis cell, where the at least one electrolysis cell is configured to electrolyze a potassium chloride solution to obtain a potassium hydroxide solution, a depleted potassium chloride solution, chlorine gas, and hydrogen gas, at least one reactor, where the at least one reactor is configured to react the potassium hydroxide solution with a lithium chloride solution to form a reciprocal salt system comprising potassium hydroxide, lithium chloride, potassium chloride, lithium hydroxide and water, and at least one crystallizer, where the at least one crystallizer is configured to precipitate the potassium chloride and lithium hydroxide from the reciprocal salt system to form lithium hydroxide crystals, and potassium chloride crystals.

An additional exemplary system for production of lithium hydroxide is described. One or more embodiments of the system include at least one electrolysis cell, where the at least one electrolysis cell is configured to electrolyze a potassium chloride solution to obtain a potassium hydroxide solution, a depleted potassium chloride solution, chlorine gas, and hydrogen gas and at least one reactor, where the at least one reactor is configured to react the potassium hydroxide solution with a lithium chloride solution to form a reciprocal salt system comprising potassium hydroxide, lithium chloride, potassium chloride, lithium hydroxide and water; and precipitate the potassium chloride and lithium hydroxide from the reciprocal salt system to form lithium hydroxide crystals, and potassium chloride crystals.

An exemplary method for production of lithium carbonate is described. One or more embodiments of the method include electrolyzing a potassium chloride solution to obtain a potassium hydroxide solution, a depleted potassium chloride solution, chlorine gas, and hydrogen gas, reacting the potassium hydroxide solution with a carbon dioxide source to form a potassium carbonate solution, and reacting the potassium carbonate solution with a lithium chloride solution to obtain a product mixture comprising potassium chloride, and lithium carbonate solids.

A further exemplary method for production of lithium carbonate is described. One or more embodiments of the method include electrolyzing a potassium chloride solution to obtain a potassium hydroxide solution, a depleted potassium chloride solution, chlorine gas, and hydrogen gas, reacting the potassium hydroxide solution with a carbon dioxide source to form a potassium carbonate solution, reacting the potassium carbonate solution with a lithium chloride solution to obtain a product mixture comprising potassium chloride; and lithium carbonate solids, removing the lithium carbonate solids from the mixture to form a regenerated potassium chloride solution, combining the regenerated potassium chloride solution with the depleted potassium chloride solution to replenish the potassium chloride solution, and repeating the electrolyzing, reacting, removing and combining steps.

An additional exemplary method for production of lithium carbonate is described. One or more embodiments of the method include electrolyzing a sodium chloride solution to obtain a sodium hydroxide solution, a depleted sodium chloride solution, chlorine gas, and hydrogen gas, reacting the sodium hydroxide solution with a carbon dioxide source to form a sodium carbonate solution, and reacting the sodium carbonate solution with a sodium chloride solution to obtain a product mixture comprising sodium chloride, and lithium carbonate solids.

A further exemplary method for production of lithium carbonate is described. One or more embodiments of the method include electrolyzing a sodium chloride solution to obtain a sodium hydroxide solution, a depleted sodium chloride solution, chlorine gas, and hydrogen gas, reacting the sodium hydroxide solution with a carbon dioxide source to form a sodium carbonate solution, reacting the sodium carbonate solution with a sodium chloride solution to obtain a product mixture comprising sodium chloride, and lithium carbonate solids, removing the lithium carbonate solids from the mixture to form a regenerated sodium chloride solution, combining the regenerated sodium chloride solution with the depleted sodium chloride solution to replenish the sodium chloride solution, and repeating the electrolyzing, reacting, removing and combining steps.

An exemplary system for production of lithium carbonate is described. One or more embodiments of the system include at least one electrolysis cell, where the at least one electrolysis cell is configured to electrolyze a potassium chloride solution to obtain a potassium hydroxide solution, a depleted potassium chloride solution, chlorine gas, and hydrogen gas and at least one reactor, where the at least one reactor is configured to react the potassium hydroxide solution with a carbon dioxide source to form a potassium carbonate solution; and react the potassium carbonate solution with a lithium chloride solution to obtain a product mixture comprising: potassium chloride, and lithium carbonate solids.

A further exemplary system for production of lithium carbonate is described. One or more embodiments of the system include at least one electrolysis cell, where the at least one electrolysis cell is configured to electrolyze a sodium chloride solution to obtain a sodium hydroxide solution, a depleted sodium chloride solution, chlorine gas, and hydrogen gas and at least one reactor, where the at least one reactor is configured to react the sodium hydroxide solution with a carbon dioxide source to form a sodium carbonate solution; and react the sodium carbonate solution with a lithium chloride solution to obtain a product mixture comprising sodium chloride, and lithium carbonate solids.

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

FIGS. 8 through 14 show examples of lithium production processes according to aspects of the present disclosure.

Figure 1:
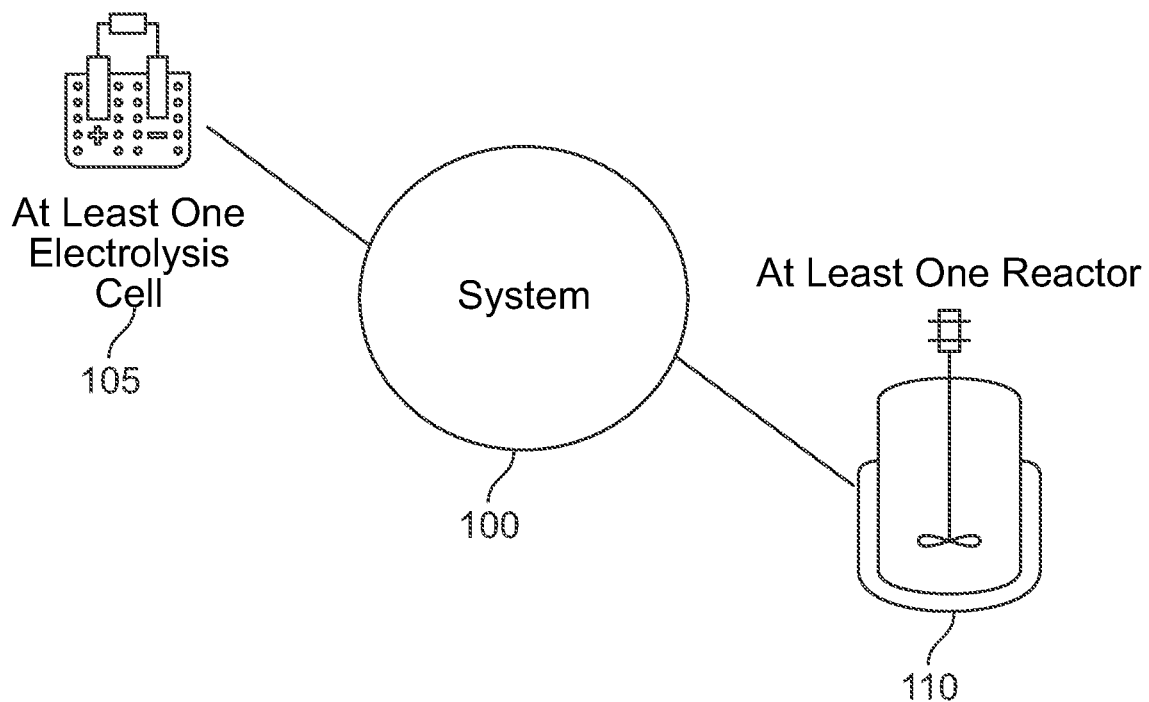
FIG. 1 shows a first example of a lithium hydroxide or lithium carbonate production system according to aspects of the present disclosure.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

A method for production of lithium hydroxide is described according to some embodiments of the present disclosure. In some examples, the lithium hydroxide can be produced using lithium chloride, potassium chloride, and water as reagents. In some aspects, the lithium hydroxide can be produced without using lime, soda ash, hydrochloric acid, sodium hydroxide, or a combination thereof as reagents.

In some examples, the lithium hydroxide is lithium hydroxide monohydrate. In some examples, the lithium hydroxide monohydrate is "battery grade," which is defined herein as being compliant with an applicable technical standard, such as, but not limited a technical standard set by the International Organization for Standardization (ISO) or the American Society for Testing and Materials (ASTM). One such non-limiting example of a standard for determining whether is lithium hydroxide monohydrate is "battery grade," is GB/T 8766-2013, which is incorporated by reference herein in its entirety. In some examples, the lithium hydroxide is a mixture of lithium hydroxide (i.e., anhydrous lithium hydroxide) and lithium hydroxide monohydrate. Herein, presence of anhydrous lithium hydroxide in lithium hydroxide monohydrate or vice versa will not be considered to adversely affect the purity of the anhydrous lithium hydroxide or lithium hydroxide monohydrate.

In some examples, the method of producing lithium hydroxide does not include directly electrolyzing lithium chloride. As used herein, "direct electrolysis of lithium chloride" is electrolysis where lithium chloride is used as an electrolyte in the electrolysis. Accordingly, one or more embodiments of the method include electrolyzing a potassium chloride solution.

In some examples, the potassium chloride solution comprises potassium chloride in an amount ranging from 10 wt % to 40 wt % of the potassium chloride based on a total weight of the potassium chloride solution. In further examples, the potassium chloride may be present in exemplary amounts ranging from: 20 wt % to 40 wt %, 30 wt % to 40 wt %, 10 wt % to 30 wt %, 10 wt % to 20 wt %, 20 wt % to 30 wt %, or any combination thereof based on a total weight of the potassium chloride solution.

In some examples, the potassium chloride solution is formed by obtaining potassium chloride (e.g., commercially) and dissolving the potassium chloride in water, brine or the depleted potassium chloride solution. In some examples, the potassium chloride is obtained by reacting potassium hydroxide with lithium chloride (as described in more detail below). In certain applications, the potassium chloride that is generated by reacting potassium hydroxide with lithium chloride can be reintroduced into the electrolysis cell, such as, via a recycle stream.

In some embodiments, the electrolysis is performed using an electrolysis cell, as discussed in further detail below. In some examples, the electrolysis cell is a chlor-alkali electrolysis cell. As used herein, a "chlor-alkali electrolysis cell" is an electrolysis cell configured to perform the following half-cell reactions:

Anode: $2Cl^- \rightarrow Cl_2 + 2e^-$.

Cathode: $H_2O + 2e^- \rightarrow H_2 + 2OH^-$.

In some examples, the electrolysis is performed using at least one mercury cell, which may utilize the Castner-Kellner process. A non-limiting example of at least one mercury cell is described in U.S. Pat. No. 528,322 which is incorporated by reference herein in its entirety for all purposes.

The electrolysis may, in some implementations, be performed at a temperature of: 20° C. or higher, 30° C. or higher, 40° C. or higher, 50° C. or higher, 60° C. or higher, 70° C. or higher, 80° C. or higher, 90° C. or higher, or 100° C. or higher. In certain examples, the electrolysis is performed at a temperature or operating temperature of: 70° C. to 120° C., 90° C. to 120° C., 100° C. to 120° C., 110° C. to 120° C., 70° C. to 110° C., 70° C. to 100° C., 70° C. to 90°, or any combination thereof.

In some examples, a temperature of the electrolysis may be a temperature of at least one electrolyte (e.g., an anolyte, a catholyte, or both) used to perform the electrolysis. Accordingly, in some examples, the temperature is measured by inserting a temperature sensor into the at least one electrolyte during the electrolysis. In some examples, the electrolysis may be performed at a lower temperature during startup, during shutdown, or both, as compared to an operating temperature of the electrolysis at "steady state." An exemplary difference between temperatures at shutdown and startup versus the operating temperature is described in "Nafion® Perfluorinated Membranes for KOH Production," Nafion® Product Bulletin, E. I. duPont de Nemours & Co., Inc., Wilmington (1988), Revised 2001 (hereinafter "The Nation® Product Bulletin"), which is incorporated herein by reference in its entirety for all purposes.

In some examples, the electrolysis is membrane electrolysis. In certain implementations, the membrane used for membrane electrolysis is selective for positive ions. In some examples, the membrane comprises at least one of: a polyolefin, a polyurethane, a polyester, a polyamide, a polyketone, polysulfones, or a polycarbonate. In some embodiments, the membrane can comprise a fluoropolymer. In some embodiments, the membrane comprises one or more of: PVDF, polyvinylidene difluoride, poly(tetrafluoroethylene-co-hexafluoropropylene) (FEP), poly(ethylene-alt-tetrafluoroethylene) (ETFE), polychlorotrifluoroethylene (PCTFE), poly(tetrafluoroethylene-co-perfluoropropyl vinyl ether) (PFA), poly(vinylidene fluoride-co-hexafluoropropylene (PVDF-co-HFP), polyvinyl fluoride (PVF), or any combination thereof. In some examples, the membrane is a sulfonated perfluorinated membrane such as, but not limited to, a Nafion™ membrane, which can be commercially obtained from DuPont™.

In some examples electrolyzing the potassium chloride solution results in a potassium hydroxide solution, a depleted potassium chloride solution, chlorine gas, and hydrogen gas.

In some examples, the hydrogen gas and chlorine gas can be reacted to form hydrochloric acid, such as through the following reaction:

$H_2(g) + Cl_2(g) \rightarrow 2HCl(aq)$

The produced hydrochloric acid can, in some cases, be used to adjust the pH of any solution described herein.

One or more embodiments of the method include reacting the potassium hydroxide solution with a lithium chloride solution.

In some examples, the lithium chloride solution comprises lithium chloride in an amount ranging from 10 wt % to 50 wt % of the lithium chloride based on a total weight of the lithium chloride solution. In further examples, the lithium chloride may be present in exemplary amounts ranging from: 20 wt % to 50 wt %, 30 wt % to 50 wt %, 40 wt % to 50 wt %, 10 wt % to 40 wt %, 10 wt % to 30 wt %, 10 wt % to 20 wt %, 20 wt % to 40 wt %, or any combination thereof based on a total weight of the lithium chloride solution.

In some examples, the lithium chloride solution is obtained from a naturally occurring brine, such as but not limited to, a geothermal brine. Further examples of naturally occurring brines that may include lithium chloride include, but are not limited to: brines from salars, brines from salt lakes, and brines from salt mines, or any combination thereof. Some specific examples of naturally occurring brines that may be suitable include, but are not limited to, brines from the Salar de Atacama, brines from the Salar de Hombre Muerto, Salar Olaroz, Salar de Cauchari, brines from Salar de Rincon, Salar Pastos Grandes, Salar el Centenari, brines from the Salar de Maricunga, brines from the Tres Quebradas, or a combination thereof. In some examples, the naturally occurring brine includes sodium, potassium, magnesium, calcium, strontium, sulfate ions, chloride ions, or any combination thereof. In some examples, the naturally occurring brine may include boron.

In some examples, the lithium chloride solution is formed by concentrating and purifying the naturally occurring brine. In some examples, the concentrating and purifying of the brine, may be performed by any mechanism known in the art, such as but not limited to, subjecting the brine to at least one of: solar evaporation, mechanical evaporation, membrane filtration, chemical precipitation, solvent extraction, ion exchange, or any combination thereof. In some examples, the membrane filtration includes nano filtration, reverse osmosis, or any combination thereof. Additional examples of non-limiting methods for concentrating are described in: Bukowsky et al., The recovery of pure lithium chloride from "brines" containing higher contents of calcium chloride and magnesium chloride, Hydrometallurgy, Volume 27, Issue 3, 1991, Pages 317-325; and Schultze et al., Recovering Lithium Chloride from a Geothermal Brine, January 1984, U.S. Department of the Interior, Bureau of Mines, and Garrett, D. 2004. Handbook of lithium and natural calcium chloride: their deposits, processing, uses and properties, each of which is incorporated by reference herein in its respective entirety for all purposes.

In some examples, the lithium chloride solution is produced from a mineral source. In some examples, the mineral source is spodumene. Non-limiting examples of methods for producing a lithium chloride solution from spodumene include U.S. Pat. Nos. 2,533,246, and 3,024,083; WIPO Patent Application Publication 2021/138345; and Barbosa et al., Extraction of lithium from β-spodumene using chlorination roasting with calcium chloride, Thermochimica Acta, Volume 605, 2015, Pages 63-67, each of which incorporated by reference herein in its respective entirety for all purposes. In certain implementations, the mineral source may comprise petalite, lepidolite, hectorite, or any combination thereof.

In certain implementations, the lithium chloride solution may be obtained from lithium carbonate. In some examples, the lithium carbonate may be produced by a lithium carbonate production method described herein.

In some examples, the lithium carbonate ($Li_2CO_3$) is reacted to form lithium chloride (LiCl) is as follows:

$$Li_2CO_3(s) + 2HCl(aq) \rightarrow 2LiCl(aq) + CO_2(g) + H_2O \quad (1)$$

In some embodiments utilizing the above reaction, the hydrochloric acid (HCl) may be obtained from the electrolysis described herein. In some embodiments of the above reaction, the carbon dioxide ($CO_2$) may be captured (e.g., using a scrubber) for re-use as the carbon dioxide source described herein (i.e., the carbon dioxide source used to produce the lithium carbonate.) The captured $CO_2$ may also be used for other purposes, such as, but not limited to, the production of potassium carbonate or the production of sodium carbonate, or other applications.

In some examples, the lithium carbonate ($Li_2CO_3$) is reacted to form lithium chloride (LiCl) is as follows:

$$2Li_2CO_3(s) + 2Cl_2(g) \rightarrow 4LiCl(aq) + 2CO_2(g) + O_2(g).$$

In some embodiments utilizing the above reaction, the chlorine gas ($Cl_2$) may be obtained from the electrolysis described herein. In some embodiments of the above reaction, the hydrogen gas from the electrolysis may be used as an energy source. In some embodiments of the above reaction, the carbon dioxide ($CO_2$) may be collected, as described above. In certain examples, the above reaction may be performed using a catalyst as described in Kim, et al., "Manufacture characteristics of metal oxide-hydroxides for the catalytic decomposition of a sodium hypochlorite solution," Chemical Engineering Journal, Volumes 200-202, 2012, pages 52-58, which is incorporated by reference herein in its entirety for all purposes.

In some examples, the reacting of lithium chloride with potassium hydroxide (KOH) may include performing the following reaction:

$$LiCl + KOH \leftrightarrow LiOH + KCl.$$

In some implementations the lithium chloride and potassium hydroxide are reacted stoichiometrically. As used herein, "stoichiometrically" means that the lithium chloride and potassium hydroxide are combined in a 1:1 molar ratio to one another. In some examples, non-stoichiometric molar ratios of lithium chloride to potassium hydroxide may also be used, such as but, not limited to, 1:2, 2:1, 1:3, 3:1, 4:1, 1:4 . . . . However, as discussed in more detail below, in certain embodiments, using a non-stoichiometric molar ratio may affect reaction yields.

In some examples, reacting the potassium hydroxide solution with the lithium chloride solution results in a reciprocal salt system. In some examples, the reciprocal salt system comprises, consists of, or consists essentially of potassium hydroxide, lithium chloride, potassium chloride, lithium hydroxide, and water. As used herein, a "reciprocal salt system" is defined in accordance with Gamsjäger, et al. "Glossary of terms related to solubility (IUPAC Recommendations 2008)" Pure and Applied Chemistry, vol. 80, no. 2, 2008, pp. 233-276, which is incorporated by reference herein in its entirety for all purposes. Using the reciprocal salt notation definition provided by Gamsjäger, et al., an exemplary reciprocal salt system of the present disclosure can be defined as follows:

$$K^+, Li^+ \| Cl^-, OH^- + H_2O$$

Some embodiments include precipitating the potassium chloride and the lithium hydroxide from the reciprocal salt system to form lithium hydroxide crystals and potassium chloride crystals. In some examples, the reacting and the precipitating are performed simultaneously, sequentially, or a combination thereof. In some examples, the reacting and the precipitating steps are performed in a single device—a crystallization reactor. In some examples, the precipitating is performed while the reciprocal salt system is in equilibrium. In some examples, the equilibrium may be chemical equilibrium, phase equilibrium, or any combination thereof. In some examples, the reacting and the precipitating steps are performed in separate devices. For instance, the reacting may be performed in at least one reactor (as described below) and the precipitating may be performed using at least one crystallizer (as described below).

In some examples, the reacting, the precipitating, or any combination thereof, may be performed at temperatures ranging from: -50° C. to 150° C., -25° C. to 150° C., 0° C. to 150° C., 25° C. to 150° C., 50° C. to 150° C., 75° C. to 150° C., 100° C. to 150° C., 125° C. to 150° C., -50° C. to 125° C., -50° C. to 100° C., -50° C. to 75° C., -50° C. to 50° C., -50° C. to 50° C., -50° C. to 25° C., -50° C. to 0° C., -50° C. to -25° C., -25° C. to 125° C., 0° C. to 100° C., 25° C. to 75° C., or any combination thereof at ambient pressure. The reacting, the precipitating, or any combination thereof, may also be performed at ambient pressure, under less than ambient pressure (e.g., by using at least one vacuum source), or under a pressure exceeding ambient pressure (e.g., using a pressurized reactor). Accordingly, changes to the operating temperature at pressures other than ambient pressure are contemplated by certain implementations of the present disclosure.

In certain implementations, the reciprocal salt system comprises the potassium chloride in an amount ranging from: 5 wt % to 30 wt %, 10 wt % to 30 wt %, 15 wt % to 30 wt %, 20 wt % to 30 wt %, 25 wt % to 30 wt %, 5 wt % to 25 wt %, 5 wt % to 20 wt %, 5 wt % to 15 wt %, 5 wt % to 10 wt %, 10 wt % to 25 wt %, 15 wt % to 20 wt %, or any combination thereof based on a total weight of the reciprocal salt system. In certain implementations, the reciprocal salt system comprises the lithium hydroxide in an amount ranging from: 1 wt % to 10 wt %, 2 wt % to 10 wt %, 5 wt % to 10 wt %, 7 wt % to 10 wt %, 9 wt % to 10 wt %, 1 wt % to 9 wt %, 1 wt % to 7 wt %, 1 wt % to 5 wt %, 1 wt % to 2 wt %, 2 wt % to 9 wt %, 5 wt % to 7 wt %, or any combination thereof based on a total weight of the reciprocal salt system. In certain implementations, the reciprocal salt system comprises water in an amount ranging from: 60 wt % to 90 wt %, 70 wt % to 90 wt %, 80 wt % to 90 wt %, 60 wt % to 80 wt %, 60 wt % to 70 wt %, 70 wt % to 80 wt %, or any combination thereof based on a total weight of the reciprocal salt system.

In some examples, precipitating the potassium chloride and lithium hydroxide from the reciprocal salt system comprises a cooling stage. In some examples, the cooling stage may be performed at a temperature ranging from: −50° C. to 50° C., −50° C. to 25° C., −50° C. to 0° C., −50° C. to −25° C., −25° C. to 50° C., 0° C. to 50° C., 25° C. to 50° C., −25° C. to 25° C., or any combination thereof at ambient pressure, with the understanding that the temperature can be modified at other pressures as mentioned above. In some examples, the cooling stage selectively precipitates the potassium chloride crystals. In some examples, a proportion of the of potassium chloride in a crystalline phase increases during the cooling stage. In some embodiments, a weight fraction of the potassium chloride in the crystalline phase to a total weight of the reciprocal salt system (g/g) may range from: 0.1 to 0.4. 0.2 to 0.4, 0.3 to 0.4, 0.1 to 0.3, 0.1 to 0.2, 0.2 to 0.3, or any combination thereof during the cooling stage.

In some examples, precipitating the potassium chloride and lithium hydroxide comprises an evaporative heating stage. In some examples, the evaporative heating stage may be performed at a temperature ranging from: 25° C. to 150° C., 50° C. to 150° C., 75° C. to 150° C., 100° C. to 150° C., 125° C. to 150° C., 25° C. to 125 C, 25° C. to 100° C., 25° C. to 75° C., 25° C. to 50 C, 50° C. to 125° C., 75° C. to 105° C., or any combination thereof at ambient pressure, with the understanding that the temperature can be modified at other pressures as mentioned above. In some examples, the evaporative heating stage selectively precipitates the lithium hydroxide crystals. In some examples, a proportion of the of lithium hydroxide in a crystalline phase increases during the evaporative heating stage. In some embodiments, a weight fraction of the lithium hydroxide in the crystalline phase to the total weight of the reciprocal salt system (g/g) may range from: 0.03 to 0.09. 0.05 to 0.09, 0.07 to 0.09, 0.03 to 0.07, 0.03 to 0.05, 0.05 to 0.07, or any combination thereof, during the evaporative heating stage.

Some examples further include purifying the lithium hydroxide crystals. Some examples of purifying the lithium hydroxide crystals further include separating the lithium hydroxide crystals from the reciprocal salt system. Some examples of purifying the lithium hydroxide crystals further include dissolving the lithium hydroxide crystals in water or a brine to form a lithium hydroxide solution. Some examples of purifying the lithium hydroxide crystals further include separating insoluble solids from the lithium hydroxide solution. Some examples of purifying the lithium hydroxide crystals further include evaporating water from the lithium hydroxide solution to recrystallize the lithium hydroxide crystals. In some examples, the dissolving, the separating, and the evaporating are repeated until a target purity is achieved. In some examples, the target purity is greater than 50 wt % of lithium hydroxide, of lithium hydroxide monohydrate, or a combination thereof based on a total weight of the lithium hydroxide crystals. In some examples, the target purity is greater than 90 wt % of lithium hydroxide, of lithium hydroxide monohydrate, or a combination thereof based on a total weight of the lithium hydroxide crystals. In some examples, the target purity is greater than 95 wt % of lithium hydroxide, of lithium hydroxide monohydrate, or a combination thereof based on a total weight of the lithium hydroxide crystals. In some examples, the target purity is greater than 99 wt % of lithium hydroxide, of lithium hydroxide monohydrate, or a combination thereof based on a total weight of the lithium hydroxide crystals. In some examples, the target purity is greater than 99.5 wt % of lithium hydroxide, of lithium hydroxide monohydrate, or a combination thereof based on a total weight of the lithium hydroxide crystals. In some examples, the target purity is greater than 99.9 wt % of lithium hydroxide of lithium hydroxide monohydrate, or a combination thereof based on a total weight of the lithium hydroxide crystals. In some examples, the target purity is from: 50 wt % to 99.9 wt %, 90 wt % to 99.9 wt %, 95 wt % to 99.9 wt %, 99 wt % to 99.9 wt %, 50 wt % to 99 wt %, 50 wt % to 95 wt %, 50 wt % to 90 wt %, or any combination thereof, of lithium hydroxide based on a total weight of the lithium hydroxide crystals.

Some examples further include separating the lithium hydroxide crystals, the potassium chloride crystals, or a combination thereof from the reciprocal salt system. Separating may be performed using a suitable separator, examples of which are delineated in further detail below. In some examples, the separating is performed using filtration, centrifugation, or any combination thereof. Some embodiments may include separating most (i.e., >50%) of the lithium hydroxide crystals, the potassium chloride crystals, or the combination thereof from the reciprocal salt system. Some embodiments may include separating all or substantially all (i.e., ≥99%) of the lithium hydroxide crystals, the potassium chloride crystals, or the combination thereof from the reciprocal salt system.

Some examples of the method further include dissolving the potassium chloride crystals that were removed from the reciprocal salt solution in in water, a brine, or the depleted potassium chloride solution and filtering a resulting mixture to recycle the potassium chloride solution. In some examples, a pH of the potassium chloride solution may be adjusted using hydrochloric generated in the manner described above. Further, as alluded to above, in certain implementations, this recycled potassium chloride solution may be recycled and reused in the at least one electrolysis cell. Accordingly, in some examples, the dissolving, electrolyzing, reacting, and precipitating steps may be repeated once or any number of times. Further, in some implementations, the recycled potassium chloride solution can be in fluid communication with the electrolysis cell, e.g., via at least one recycle stream. In further implementations, the recycled potassium chloride solution may be added to the electrolysis cell in batches or by any other flow arrangement known in the art.

A method for production of lithium carbonate is described according to some embodiments of the present disclosure. In some examples, the lithium carbonate can be produced using lithium chloride, potassium chloride or sodium chloride, water, and a carbon dioxide source as reagents. In some aspects, the lithium carbonate can be produced without using lime, soda ash, hydrochloric acid, sodium hydroxide, or a combination thereof as reagents.

One or more embodiments of the method for producing lithium carbonate include electrolyzing a potassium chloride or sodium chloride solution, as described above. In examples where the sodium chloride solution is used, sodium chloride can be substituted for potassium chloride in a specific electrolyzing step. Deviations from electrolysis conditions when sodium chloride is used, may in certain examples, be made in accordance with the Nation® Product Bulletin, which is described above.

In certain examples, the electrolysis results in a potassium hydroxide or sodium hydroxide solution, a depleted potassium chloride or a depleted sodium chloride solution, chlorine gas, and hydrogen gas. In some examples, the chlorine gas and the hydrogen gas may be reacted to form hydrochloric acid, as described above. This hydrochloric acid may be used as a pH adjusting agent, as described further above and below.

One or more embodiments of the method include reacting the potassium hydroxide or sodium hydroxide solution with a carbon dioxide source to form a potassium carbonate solution or sodium carbonate solution. The reacting may comprise at least one of the following reactions:

$$2KOH(aq)+2CO_2(g) \rightarrow K_2CO_3(aq)+H_2O(aq). \quad (1)$$

$$2NaOH(aq)+2CO_2(g) \rightarrow Na_2CO_3(aq)+H_2O(aq). \quad (2)$$

The carbon dioxide source may, in some cases, be carbon dioxide gas ($CO_2$). In some implementations, the carbon dioxide gas may be obtained from air, from power generation, or any other means known in the art. In some examples, the carbon dioxide gas may be obtained from a reaction, described above, for forming the lithium chloride solution.

In some embodiments, the carbon dioxide source can be chemical elements or compounds that, when reacted, form $CO_2$. For instance, in a particular implementation, the carbon dioxide source may comprise an alkali metal bicarbonate (hereinafter $MHCO_3$) and acetic acid. The alkali metal M, may in some embodiments, be sodium or potassium. The alkali metal bicarbonate ($MHCO_3$) and acetic acid ($CH_3COOH$) can react to form $CO_2$ and an alkali metal acetate ($MCH_3COO$) in the following reaction:

$$MHCO_3(aq)+CH_3COOH(l) \rightarrow CO_2(g)+H_2O(l)+MCH_3COO(aq).$$

In some embodiments, the method includes reacting the potassium carbonate solution or sodium carbonate solution with a lithium chloride solution. In certain implementations, the reacting is performed with a reaction mixture comprising potassium carbonate or sodium carbonate and lithium chloride.

In some examples, the reacting comprises at least one of the following reactions:

$$K_2CO_3(aq)+2LiCl(aq) \rightarrow Li_2CO_3(s)+2KCl(aq). \quad (1)$$

$$Na_2CO_3(aq)+2LiCl(aq) \rightarrow Li_2CO_3(s)+2NaCl(aq). \quad (2)$$

In some examples, the reacting of the potassium carbonate with the lithium chloride is performed by heating the reaction mixture to a temperature sufficient to react the potassium carbonate or sodium carbonate with the lithium chloride. In some examples, the temperature is raised to from: 30° C. to 120° C., 40° C. to 120° C., 50° C. to 120° C. 60° C. to 120° C., 70° C. to 120° C., 80° C. to 120° C., 90° C. to 120° C., 100° C. to 120° C., 110° C. to 120° C., 30° C. to 110° C., 30° C. to 100° C., 30° C. to 90° C., 30° C. to 80° C., 30° C. to 70° C., 30° C. to 60° C., 30° C. to 50° C., 30° C. to 40° C., 40° C. to 110° C., 50° C. to 100° C., 60° C. to 90° C., 70° C. to 80° C. or any combination thereof.

In certain implementations, the reacting results in a product mixture comprising: potassium chloride or sodium chloride; and lithium carbonate solids. Some embodiments include removing the lithium carbonate solids from the product mixture. In certain embodiments, at least some of the lithium carbonate solids are removed from the product mixture. In certain embodiments, most (>50%) of the lithium carbonate solids are removed from the product mixture. In certain embodiments, all or substantially all (≥99%) of the lithium carbonate solids are removed from the product mixture. The removing may be performed with at least one suitable separator described herein.

In certain examples, removal of the lithium carbonate solids results in a regenerated potassium chloride solution or a regenerated sodium chloride solution.

Some embodiments include combining the regenerated potassium chloride solution or the regenerated sodium chloride solution with the depleted potassium chloride solution or the depleted sodium chloride solution to replenish the potassium chloride solution or sodium chloride solution. Accordingly, in certain examples, the electrolyzing, reacting, removing and combining steps may be repeated once or any number of times. The regeneration of the potassium chloride solution or sodium chloride solution may be performed, for example, using at least one recycle stream as described herein.

Some examples further include adjusting a pH of the potassium chloride solution, the regenerated potassium chloride solution, the sodium chloride solution, or the regenerated sodium chloride solution. In certain implementations, the pH can be adjusted using hydrochloric acid (e.g., the hydrochloric acid obtained by reacting the hydrogen and chlorine gas) as discussed above. In some examples, the pH of the potassium chloride solution or sodium chloride solution is adjusted to: 2 to 8, 5 to 8, 6 to 8, 7 to 8, 4 to 7, 4 to 6, 4 to 5, 5 to 7, or any combination thereof.

FIG. 1 shows a first example of a lithium production system 100 according to aspects of the present disclosure.

Lithium production system 100 may be used to produce lithium hydroxide (including lithium hydroxide monohydrate), lithium carbonate, or any combination thereof in accordance with the present disclosure. The example shown includes, at least one electrolysis cell 105, and at least one reactor 110. System 100 may be an example of, or may include aspects of, the corresponding element described with reference to FIGS. 2 and 3.

According to some embodiments, electrolysis cell 105 electrolyzes a potassium chloride solution or a sodium chloride solution to obtain: a potassium hydroxide or sodium hydroxide solution; a depleted potassium chloride or sodium chloride solution; chlorine gas; and hydrogen gas. In some examples, the electrolysis cell 105 performs chlor-alkali electrolysis. In some examples, the electrolysis cell 105 utilizes mercury cell technology. Electrolysis cell 105 may be an example of, or may include aspects of, the corresponding element described with reference to FIGS. 2-4.

According to some embodiments, the at least one reactor 110 reacts the potassium hydroxide solution with a lithium chloride. In some examples, reactor 110 reacts the hydrogen gas with the chlorine gas to produce hydrochloric acid. In some examples, the at least one reactor 110 includes at least one crystallization reactor 110. In some examples, reactor 110 may take the form of a plurality of reactors (not shown in FIG. 1) either in series or parallel. Additional, non-limiting examples of the at least one reactor 110 include, but are not limited to a batch reactor, a continuous stirred-tank reactor (CSTR), a plug flow reactor (PFR), or a combination thereof. According to some embodiments, the at least one reactor 110 reacts a potassium hydroxide solution or a sodium hydroxide solution with a carbon dioxide source to form a potassium carbonate solution or sodium carbonate solution. In some examples, the at least one reactor 110 reacts the potassium carbonate solution or sodium carbonate solution with a lithium chloride solution to obtain a product mixture including potassium chloride or sodium chloride, and lithium carbonate solids. In some examples, the at least one reactor 110 is configured to react the sodium hydroxide solution or potassium hydroxide solution with a carbon dioxide source to form a sodium carbonate solution or a potassium carbonate solution; and react the sodium carbonate solution or potassium carbonate solution with a lithium chloride solution to obtain a product mixture including sodium chloride or potassium chloride and lithium carbonate solids. The at least one reactor 110 may be an example of, or may include aspects of, the corresponding element described with reference to FIGS. 2 and 3.

Figure 2:
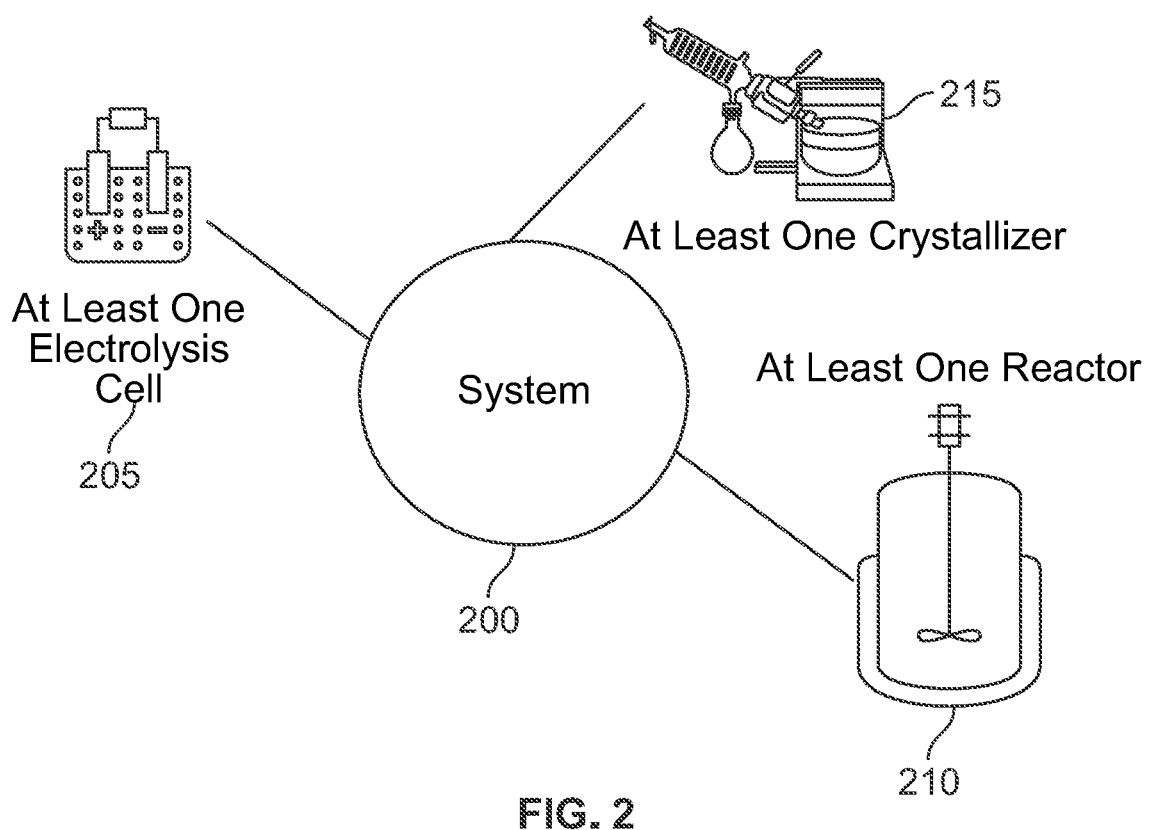
FIG. 2 shows a second example of a lithium production system according to aspects of the present disclosure.

FIG. 2 shows a second example of a lithium production system 200 according to aspects of the present disclosure. The example shown includes, at least one electrolysis cell 205, at least one reactor 210, and at least one crystallizer 215.

System 200 may be an example of, or may include aspects of, the corresponding element described with reference to FIGS. 1 and 3.

The at least one electrolysis cell 205 may be an example of, or may include aspects of, the corresponding element described with reference to FIGS. 1, 3, and 4. The at least one reactor 210 may be an example of, or may include aspects of, the corresponding element described with reference to FIGS. 1 and 3. Electrolysis cell 205 may electrolyze a potassium chloride solution or sodium chloride solution to obtain a potassium hydroxide solution or a sodium hydroxide solution. In the example of FIG. 2, the electrolysis cell 205 may comprise at least one membrane, and the electrolyzing may be performed using membrane electrolysis, such as, but not limited to, chlor-alkali electrolysis.

According to some embodiments, the at least one crystallizer 215 is configured to precipitate the potassium chloride and the lithium hydroxide from the reciprocal salt system 200 to form lithium hydroxide crystals and potassium chloride crystals. In some examples, the at least one crystallizer 215 may be an example of, or may include aspects of, the corresponding element described with reference to FIG. 3. In some examples, the at least one reactor 210 and the at least one crystallizer 215 may be a single device, such as, but not limited to, a crystallization reactor. In some examples, at least one crystallizer 215 may be separate from the at least one reactor 210. In some such examples, the at least one crystallizer 215 may take the form of a plurality of crystallizers either in series or parallel, such as, but not limited to a multi-effect crystallizer train. In some embodiments, the at least one crystallizer 215, may comprise a mechanical vapor compressor crystallizer. In some examples, the at least one crystallizer 215 may be in thermal communication with an inductive or convective heat source. One exemplary convective heat source is steam. One exemplary inductive heat source is a heating coil. Further non-limiting examples of the at least one crystallizer 215 include a mixed suspension mixed product removal (MSMPR) crystallizer, a circulating liquor crystallizer, a scraped surface crystallizer, a tank crystallizer, a forced circulation crystallizer, a draft tube baffle (DTB) crystallizer, or any combination thereof.

Figure 3:
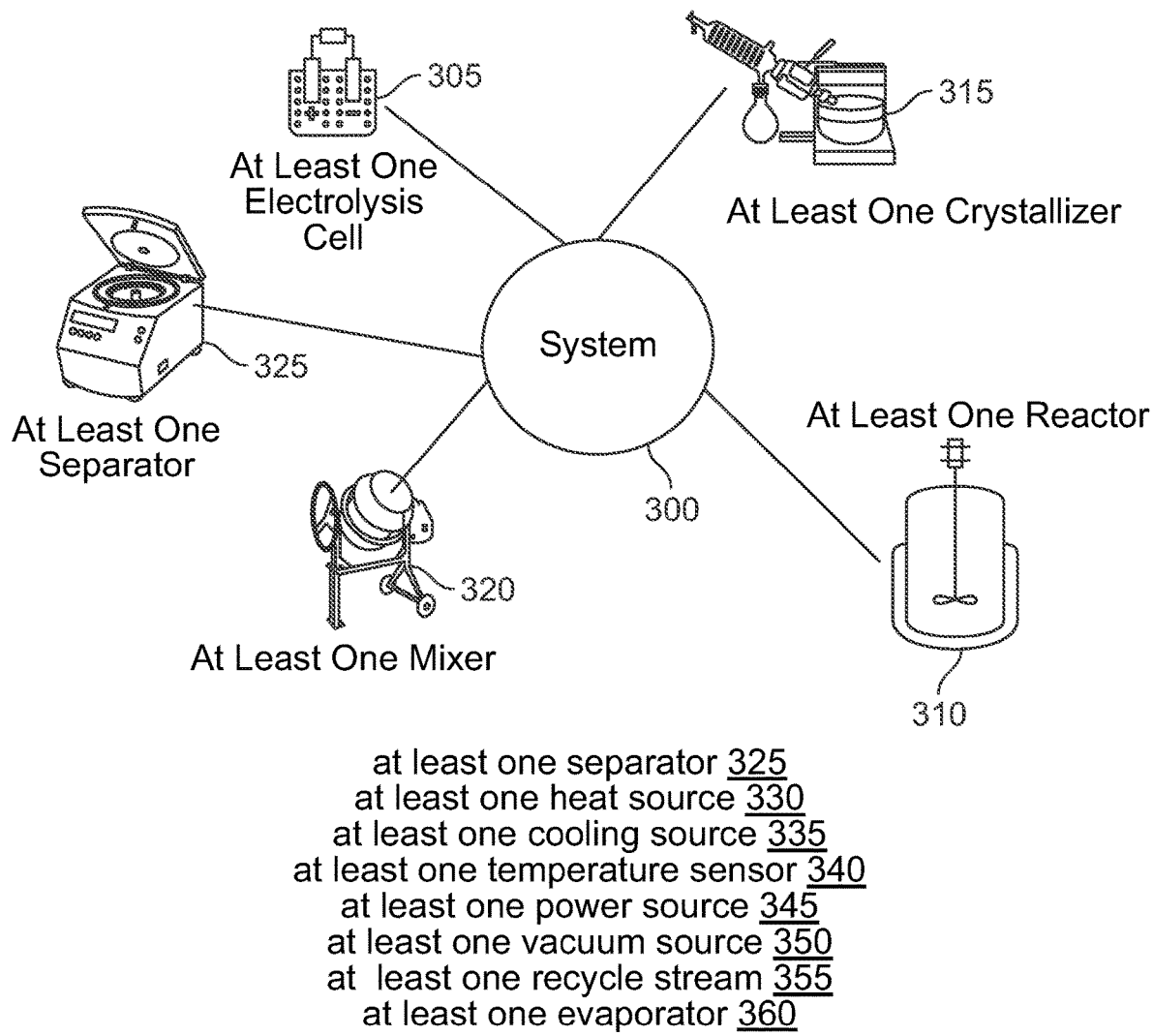
FIG. 3 shows a third example of a lithium hydroxide or lithium carbonate production system according to aspects of the present disclosure.

FIG. 3 shows a third example of a lithium production system 300 according to aspects of the present disclosure. The example shown includes at least one electrolysis cell 305, at least one reactor 310, at least one crystallizer 315, at least one mixer 320, and at least one separator 325. System 300 may be an example of, or may include aspects of, the corresponding element described with reference to FIGS. 1 and 2. Electrolysis cell 305 may be an example of, or may include aspects of, the corresponding element described with reference to FIGS. 1, 2, and 4. Reactor 310 may be an example of, or may include aspects of, the corresponding element described with reference to FIGS. 1 and 2. Crystallizer 315 may be an example of, or may include aspects of, the corresponding element described with reference to FIG. 2.

In some examples, mixer 320 dissolves the potassium chloride crystals or sodium chloride crystals in water, a brine, the depleted potassium chloride solution, or the depleted sodium chloride solution to obtain the potassium chloride solution or the sodium chloride solution. In some examples, mixer 320 dissolves the lithium hydroxide crystals in water or a brine to form a lithium hydroxide solution. According to some embodiments, mixer 320 combines the regenerated potassium chloride solution with the depleted potassium chloride or depleted sodium chloride solution, to replenish the potassium chloride solution or sodium chloride solution. In some examples, mixer 320 adjusts a pH of the potassium chloride solution or sodium chloride solution. In some examples, mixer 320 may take the form of a plurality of mixers either in series or parallel. Non-limiting examples of the mixer 320 include a vertically or horizontally agitated tank, a high or low shear tubular mixer, a horizontal paddle mixer, a screw transport mixer, a continuous high shear mixer, a progressive cavity mixing pump, or any combination thereof.

According to some embodiments, separator 325 separates the lithium hydroxide crystals from the reciprocal salt system 300. In some examples, separator 325 separates insoluble solids from the lithium hydroxide solution. In some examples, separator 325 separates the lithium hydroxide crystals, the potassium chloride crystals, or a combination thereof from the reciprocal salt system 300. In some examples, separator 325 separates the lithium hydroxide crystals, the potassium chloride crystals, or a combination thereof from the reciprocal salt system 300 using filtration, centrifugation, or any combination thereof. In some examples, the at least one separator 325 includes a centrifuge, a filter, or a combination thereof. According to some embodiments, separator 325 separates the lithium carbonate solids from the product mixture, to obtain a regenerated potassium chloride solution or a regenerated sodium chloride solution. According to some embodiments, separator 325 including at least one separator 325, where the at least one separator 325 is configured to remove the lithium carbonate solids from the product mixture of lithium carbonate and sodium chloride or potassium chloride. In some examples, separator 325 comprises a filter press, a belt filter, a plate filter, a sedimentation centrifuge, a filter centrifuge, or any combination thereof.

Lithium production system 300 may further comprise at least one heat source 330, at least one cooling source 335, at least one temperature sensor 340, at least one power source 345, at least one vacuum source 350, at least one recycle stream 355, at least one evaporator 360 or any combination thereof.

In some examples the at least one heat source 330 comprises a furnace, a boiler, a heat pump, a stove, an oven, a flanged heater, a circulation heater, a screw-plug heater, or any combination thereof.

In some examples, the at least one cooling source 335 comprises a refrigerant, a cooling jacket, an evaporative cooler, a cooling tower, pumpable ice, or any combination thereof.

In some examples, the at least one temperature sensor 340 comprises a thermocouple, a temperature monitoring controller, a resistance temperature detector, a thermistor, a semiconductor based integrated circuits, or any combination thereof.

In some examples, the at least one power source 345 comprises, electricity, mechanical power, at least one fossil fuel, coal, nuclear power, hydrogen, at least one fuel cell, at least one nuclear fission reactor, at least one nuclear fusion reactor, or any combination thereof.

In some examples, the at least one vacuum source 350 may be used to perform a reaction or a precipitation described herein at a pressure of less than ambient pressure. In some examples, the at least one vacuum source 350 comprises a rotary vane pump, a diaphragm pump, a piston pump, a scroll pump, a screw pump, an external vane pump, or any combination thereof.

In some examples, the at least one recycle stream 355 combines the regenerated potassium chloride solution with the depleted potassium chloride solution to replenish the potassium chloride solution. In some examples, the at least one recycle stream 355 combines the regenerated sodium chloride solution with the depleted sodium chloride solution to replenish the sodium chloride solution. In some examples, the at least one recycle stream 355 can reintroduce recycled potassium chloride into electrolysis cell 305.

In some examples, the at least one evaporator 360 may evaporate water from the lithium hydroxide solution to recrystallize the lithium hydroxide crystals. The at least one evaporator 360 may, in some examples, comprise a climbing film evaporator, a short-tube vertical evaporator, a basket-type evaporator, a long-tube vertical evaporator, a plate evaporator, a horizontal tube shell-side evaporator, a trough evaporator, a rotary drum evaporator, or any combination thereof.

Figure 4:
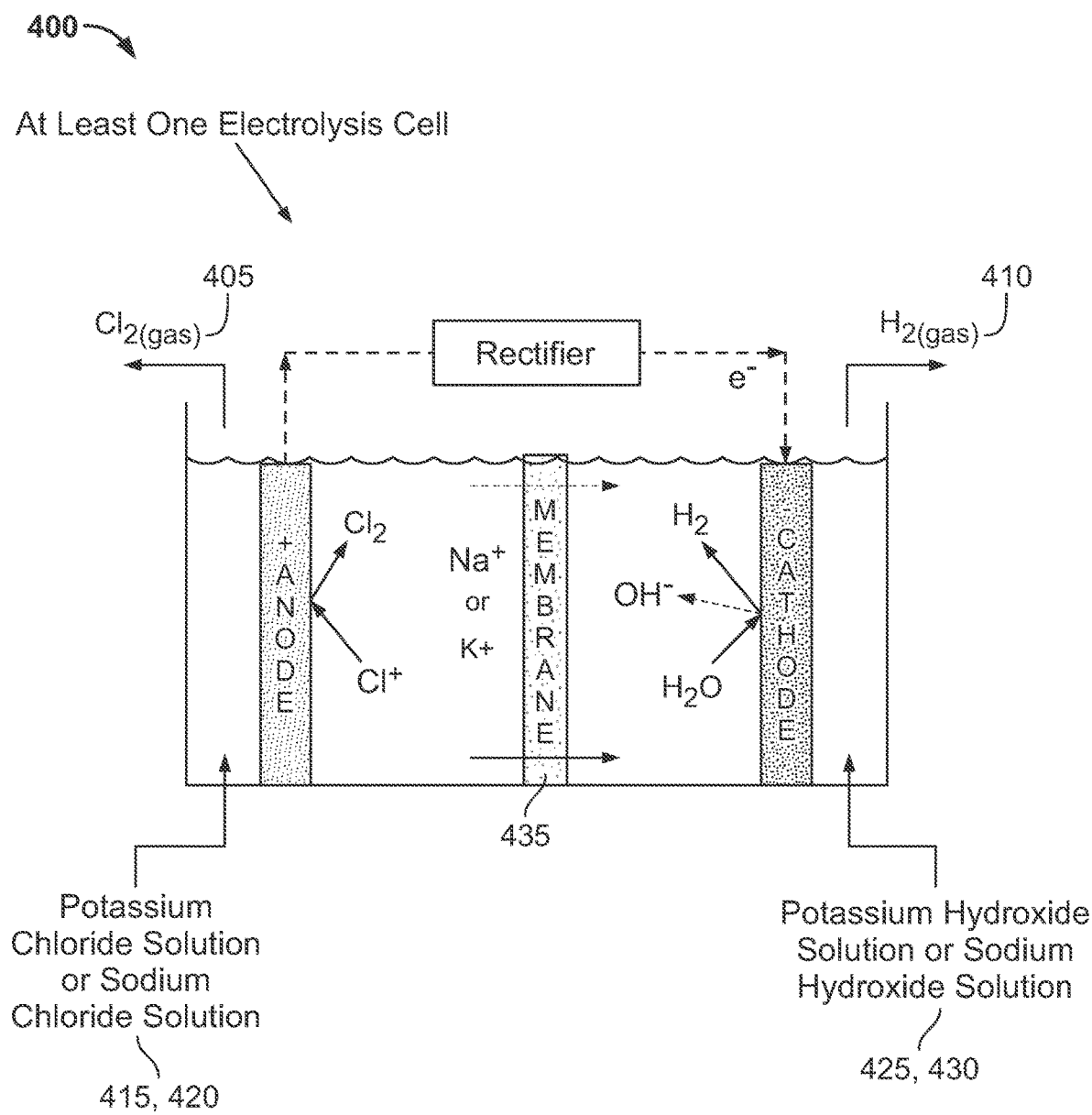
FIG. 4 shows an example of at least one electrolysis cell according to aspects of the present disclosure.

FIG. 4 shows an example of at least one electrolysis cell 400 according to aspects of the present disclosure. Electrolysis cell 400 may be an example of, or may include aspects of, the corresponding element described with reference to FIGS. 1-3. In one embodiment, electrolysis cell 400 includes chlorine gas 405, hydrogen gas 410, potassium chloride solution 415 or sodium chloride solution 420, potassium hydroxide solution 425 or sodium hydroxide solution 430, and membrane 435. Potassium chloride solution 415 may be an example of, or may include aspects of, the corresponding element described with reference to FIG. 7. Potassium hydroxide solution 425 may be an example of, or may include aspects of, the corresponding element described with reference to FIG. 7. Membrane 435 may be an example of, or may include aspects of, the corresponding element described with reference to FIGS. 5 and 6 or may be any membrane, such as, but not limited to, a perfluorinated sulfonated membrane (e.g., Nafion®), as described herein.

Figure 5:
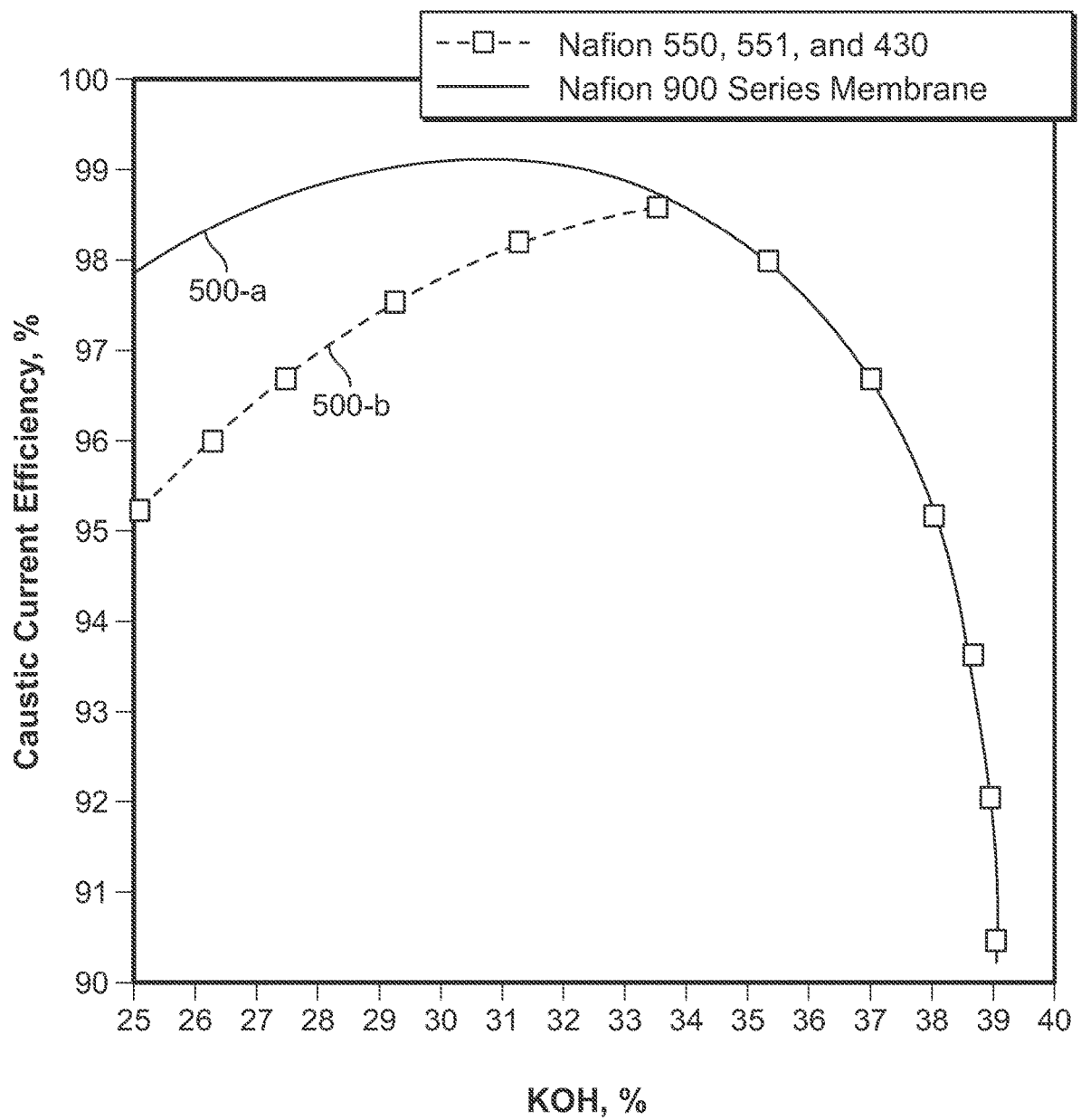
FIG. 5 shows exemplary current efficiencies for example membranes according to aspects of the present disclosure.

FIG. 5 shows exemplary current efficiencies for membranes 500 that may be used in accordance with aspects of the present disclosure. Membrane 500 may be an example of, or may include aspects of, the corresponding element described with reference to FIGS. 4 and 6. Specifically, the current efficiencies shown are associated with membranes 500-*a* and 500-*b*. Membranes 500-*a* and 500-*b* are Nafion® membranes which can be commercially obtained from DuPont™. The exemplary current efficiencies were obtained from Fluorinated Ionomers (Second Edition), Plastics Design Library 2011, Pages 81-156, which is incorporated by reference herein in its entirety for all purposes (hereinafter "Fluorinated Ionomers.") As shown, different membrane types and different concentrations of potassium hydroxide or sodium hydroxide can influence the efficiency of membrane electrolysis.

Figure 6:
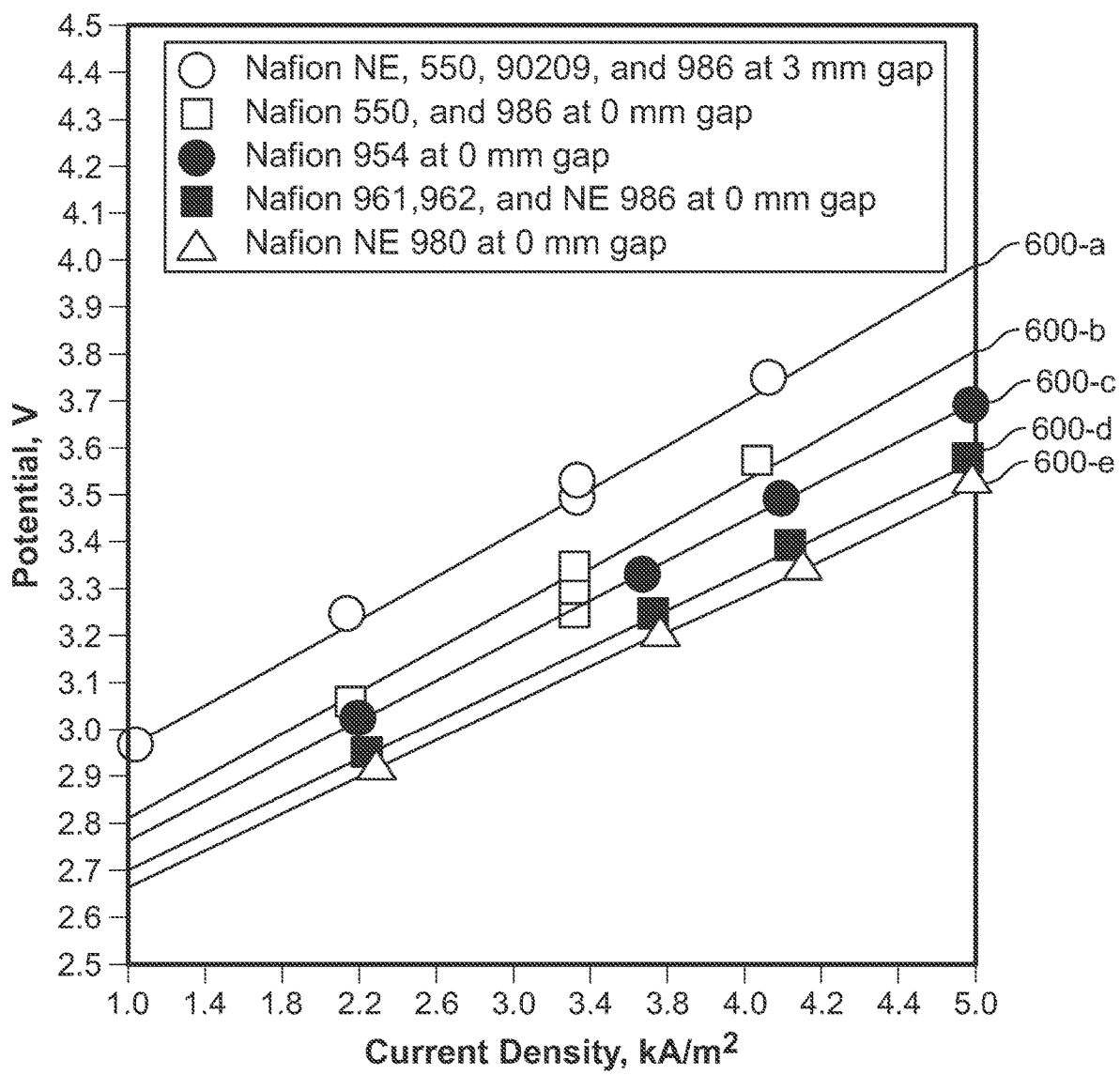
FIG. 6 shows exemplary voltages for example membranes according to aspects of the present disclosure.

FIG. 6 shows exemplary voltages for example membranes 600 according to aspects of the present disclosure. Membrane 600 may be an example of, or may include aspects of, the corresponding element described with reference to FIGS. 4 and 5. FIG. 6 were generated at 90° C., using 32 wt % KOH, and 170 to 200 g/l KCl using Nation® membranes, which can be commercially obtained from DuPont™. Exemplary voltages for membranes 600-*a*, 600-*b*, 600-*c*, 600-*d*, and 600-*e* are shown at different current densities. The exemplary voltages were obtained from Fluorinated Ionomers, referenced above. As shown, different membrane types and different concentrations of potassium hydroxide can influence the efficiency of membrane electrolysis. In some examples, the presence of sodium hydroxide (either in a potassium hydroxide solution or as a sodium hydroxide solution) may influence this efficiency to an efficiency that is not depicted in FIG. 6 without departing from the scope of the present disclosure.

Figure 7:
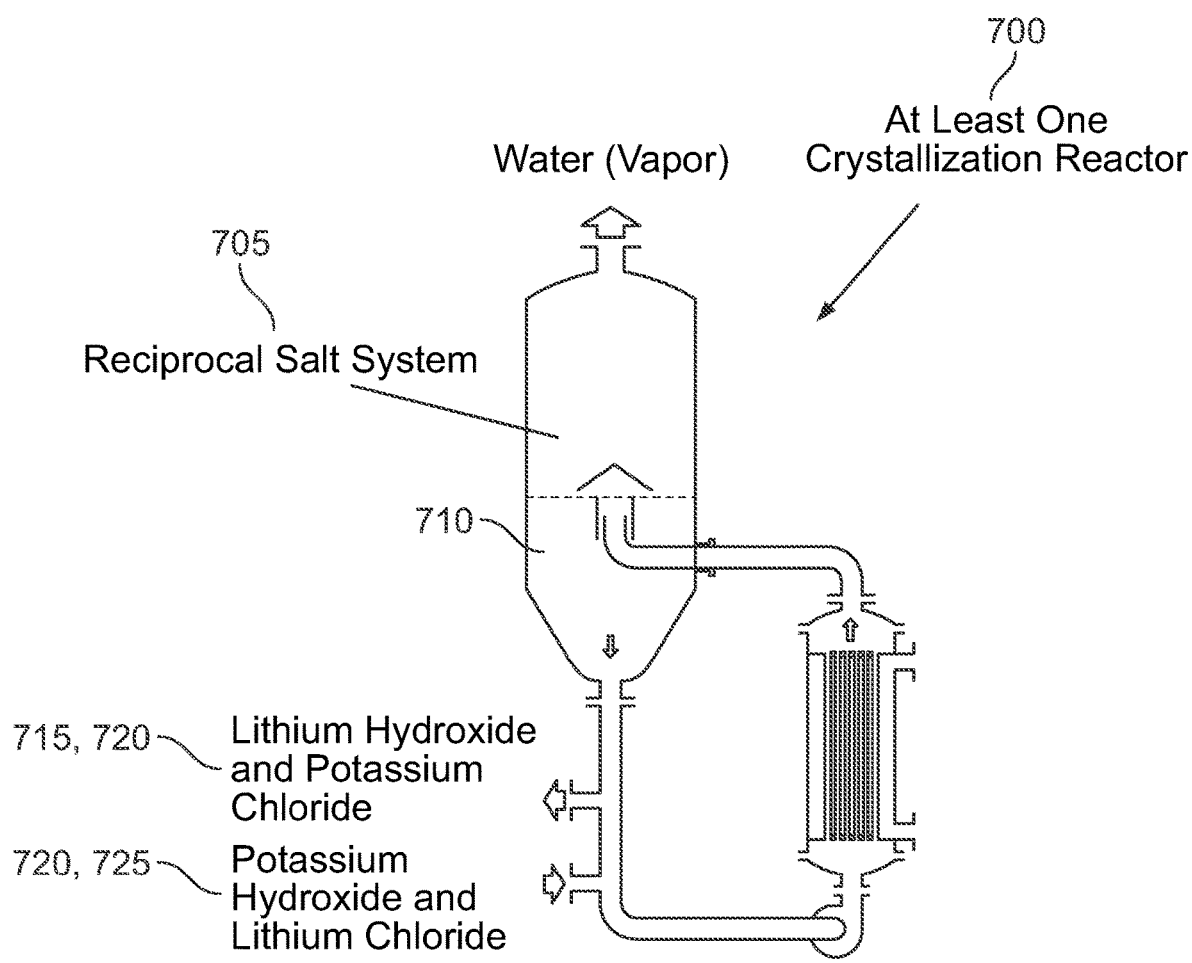
FIG. 7 shows an exemplary crystallization reactor according to aspects of the present disclosure.
Figure 17:
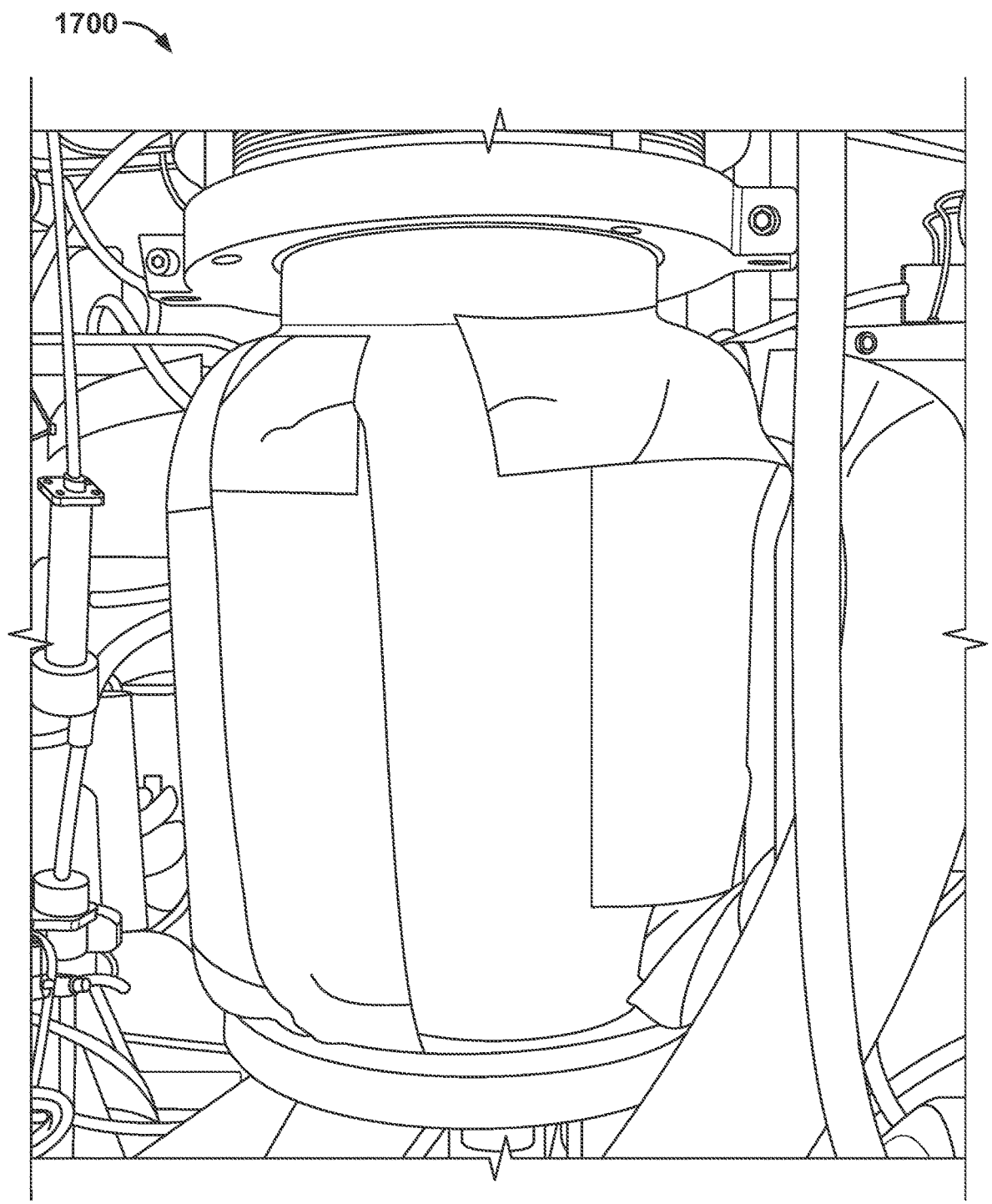
FIG. 17 shows an example of a second exemplary crystallization reactor that was used to perform a relative solubility test of lithium hydroxide and potassium chloride at different temperatures according to aspects of the present disclosure.

FIG. 7 shows an exemplary crystallization reactor 700 according to aspects of the present disclosure. Crystallization reactor 700 may be an example of, or may include aspects of, the corresponding element described with reference to FIG. 17. In one embodiment, crystallization reactor 700 includes reciprocal salt system 705, water 710, lithium chloride 715, potassium hydroxide solution 720, lithium hydroxide solution 725, and potassium chloride solution 730. Reciprocal salt system 705 may be an example of, or may include aspects of, the corresponding element described with reference to FIG. 15. Reciprocal salt system 705 may in some examples, be denoted as follows: $K^+$, $Li^+\|Cl^-$, $OH^-+H_2O$. Potassium hydroxide solution 720 may be an example of, or may include aspects of, the corresponding element described with reference to FIG. 4. Potassium chloride solution 730 may be an example of, or may include aspects of, the corresponding element described with reference to FIG. 4. In some examples, crystallization reactor 700 is a continuous crystallization reactor, a batch crystallization reactor, an agitating vessel crystallization reactor, a trough crystallization reactor, a cooling crystallization reactor, a direct contact cooling crystallization reactor, a steam-heated evaporative crystallization reactor, a forced circulation evaporative crystallization reactor, a DTB crystallization reactor, a turbulence crystallization reactor, a fluidized bed agitation crystallization reactor, a multistage vacuum crystallization reactor, or any combination thereof.

Figure 8:
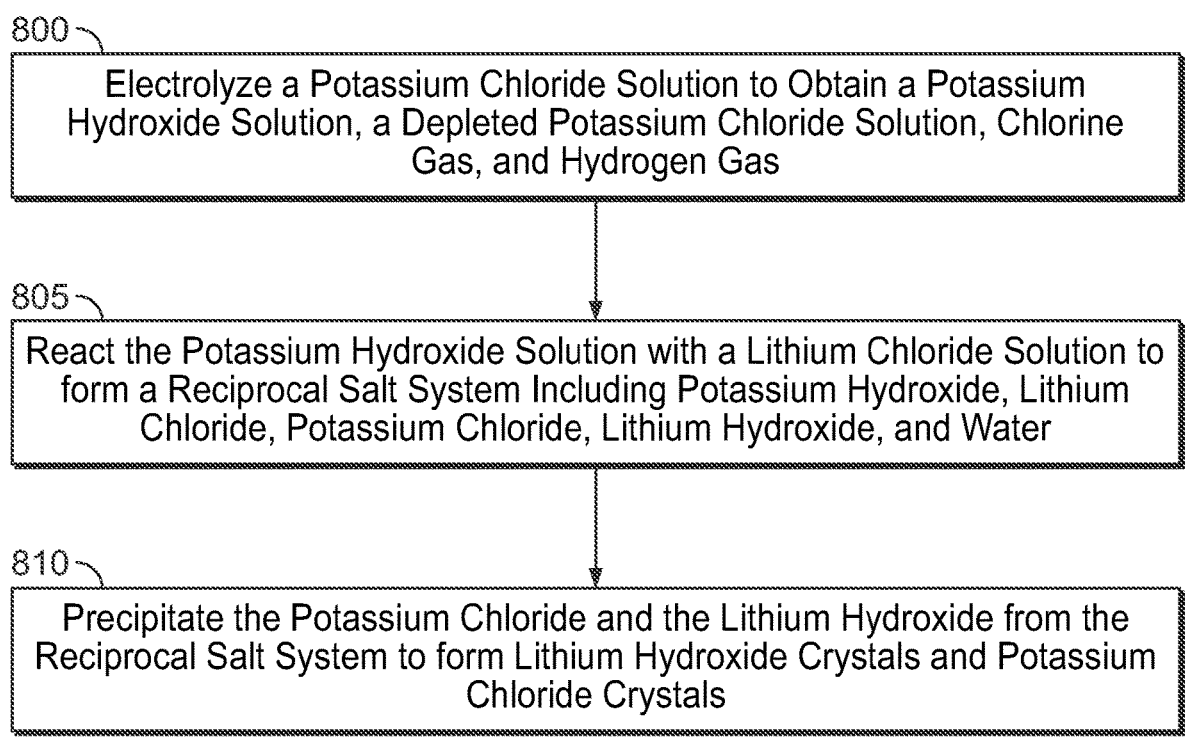

FIG. 8 shows an example of a process for production of lithium hydroxide according to aspects of the present disclosure. In some cases, the operations described herein are composed of various substeps, or are performed in conjunction with other operations. At operation 800, the system electrolyzes a potassium chloride solution to obtain a potassium hydroxide solution, a depleted potassium chloride solution, chlorine gas, and hydrogen gas. In some cases, the operations of this step refer to, or may be performed by, an electrolysis cell as described with reference to FIGS. 1-4. At operation 805, the system reacts the potassium hydroxide solution with a lithium chloride solution to form a reciprocal salt system including potassium hydroxide, lithium chloride, potassium chloride, lithium hydroxide, and water. In some cases, the operations of this step refer to, or may be performed by, a reactor as described with reference to FIGS. 1-3. At operation 810, the system precipitates the potassium chloride and the lithium hydroxide from the reciprocal salt system to form lithium hydroxide crystals and potassium chloride crystals. In some cases, the operations of this step refer to, or may be performed by, a crystallizer as described with reference to FIGS. 2 and 3.

Figure 9:
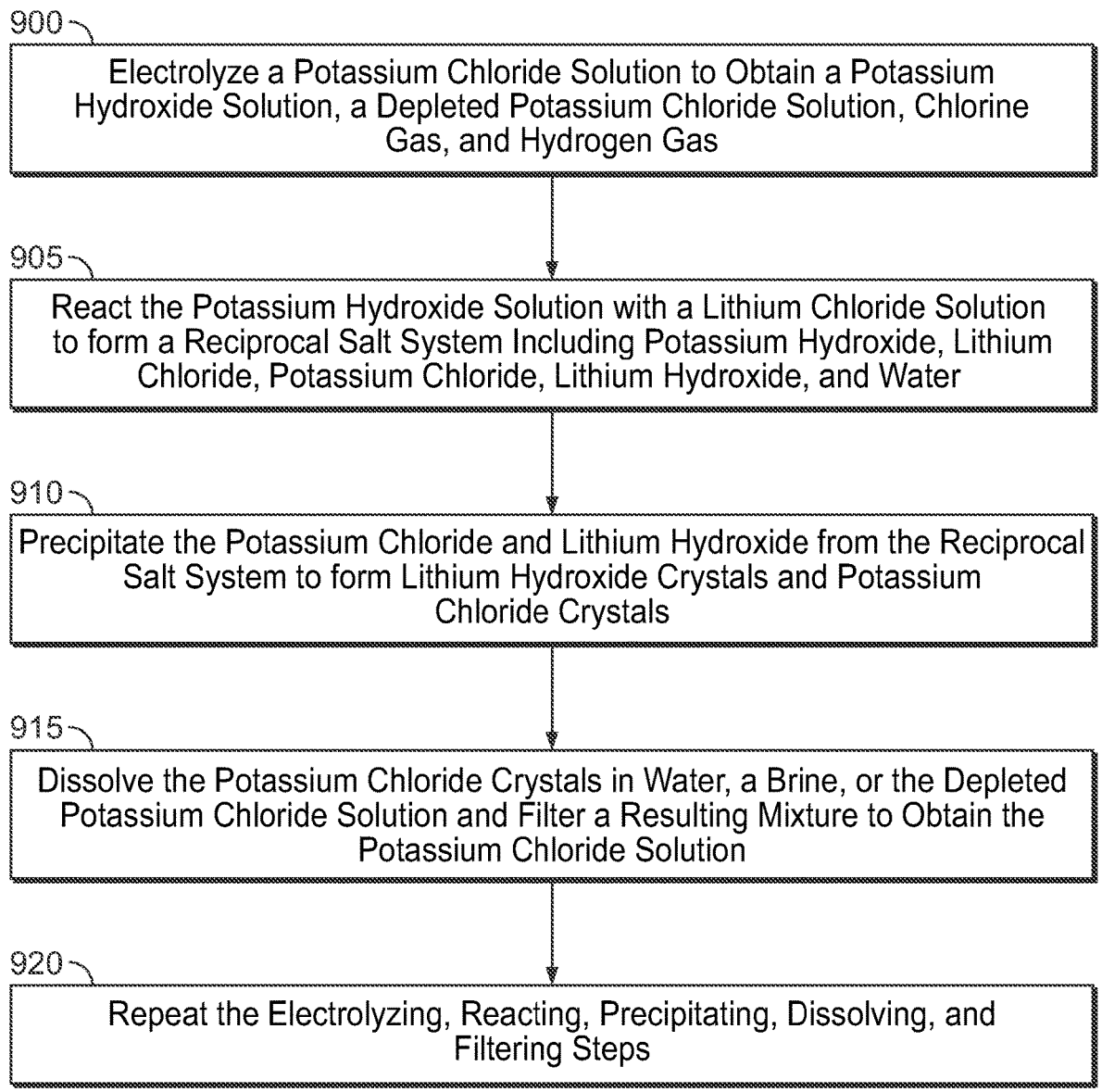

FIG. 9 shows an example of a process for production of lithium hydroxide according to aspects of the present disclosure. At operation 900, the system electrolyzes a potassium chloride solution to obtain a potassium hydroxide solution, a depleted potassium chloride solution, chlorine gas, and hydrogen gas. In some cases, the operations of this step refer to, or may be performed by, an electrolysis cell as described with reference to FIGS. 1-4. At operation 905, the system reacts the potassium hydroxide solution with a lithium chloride solution to form a reciprocal salt system including potassium hydroxide, lithium chloride, potassium chloride, lithium hydroxide, and water. In some cases, the operations of this step refer to, or may be performed by, a reactor as described with reference to FIGS. 1-3. At operation 910, the system precipitates the potassium chloride and lithium hydroxide from the reciprocal salt system to form lithium hydroxide crystals and potassium chloride crystals. In some cases, the operations of this step refer to, or may be performed by, a crystallizer as described with reference to FIGS. 2 and 3. At operation 915, the system dissolves the potassium chloride crystals in water, a brine, or the depleted potassium chloride solution to obtain the potassium chloride solution. In some cases, the operations of this step refer to, or may be performed by, a mixer as described with reference to FIG. 3. At operation 920, the system repeats the electrolyzing, reacting, precipitating, dissolving, and filtering steps. In some cases, the operations of this step refer to, or may be performed by, an electrolysis cell as described with reference to FIGS. 1-4.

Figure 10:
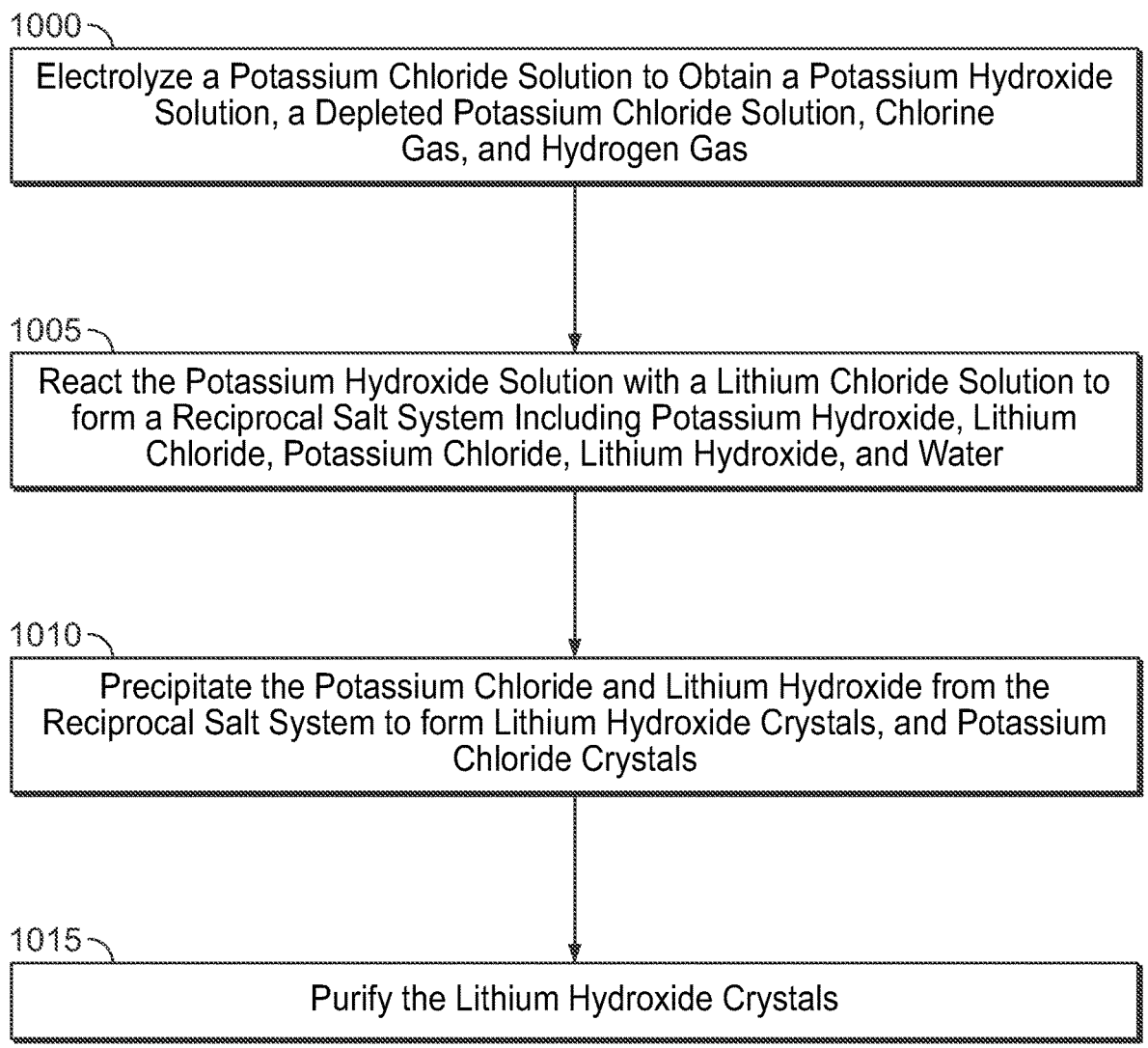

FIG. 10 shows an example of a process for production of lithium hydroxide according to aspects of the present disclosure. In some cases, the operations described herein are composed of various substeps, or are performed in conjunction with other operations. At operation 1000, the system electrolyzes a potassium chloride solution to obtain a potassium hydroxide solution, a depleted potassium chloride solution, chlorine gas, and hydrogen gas. In some cases, the operations of this step refer to, or may be performed by, an electrolysis cell as described with reference to FIGS. 1-4. At operation 1005, the system reacts the potassium hydroxide solution with a lithium chloride solution to form a reciprocal salt system including potassium hydroxide, lithium chloride, potassium chloride, lithium hydroxide, and water. In some cases, the operations of this step refer to, or may be performed by, a reactor as described with reference to FIGS. 1-3. At operation 1010, the system precipitates the potassium chloride and lithium hydroxide from the reciprocal salt system to form lithium hydroxide crystals, and potassium chloride crystals. In some cases, the operations of this step refer to, or may be performed by, a crystallizer as described with reference to FIGS. 2 and 3. At operation 1015, the system purifies the lithium hydroxide crystals. In some cases, the operations of this step refer to, or may be performed by, a mixer as described with reference to FIG. 3.

FIG. 11 shows an example of a process for production of lithium carbonate from lithium chloride and potassium chloride according to aspects of the present disclosure. At operation 1100, the system electrolyzes a potassium chloride solution to obtain a potassium hydroxide solution, a depleted potassium chloride solution, chlorine gas, and hydrogen gas. In some cases, the operations of this step refer to, or may be performed by, an electrolysis cell as described with reference to FIGS. 1-4. At operation 1105, the system reacts the potassium hydroxide solution with a carbon dioxide source to form a potassium carbonate solution. In some cases, the operations of this step refer to, or may be performed by, a reactor as described with reference to FIGS. 1-3. At operation 1110, the system reacts the potassium carbonate solution with a lithium chloride solution to obtain a product mixture including potassium chloride, and lithium carbonate solids. In some cases, the operations of this step refer to, or may be performed by, a reactor as described with reference to FIGS. 1-3.

Figure 12:
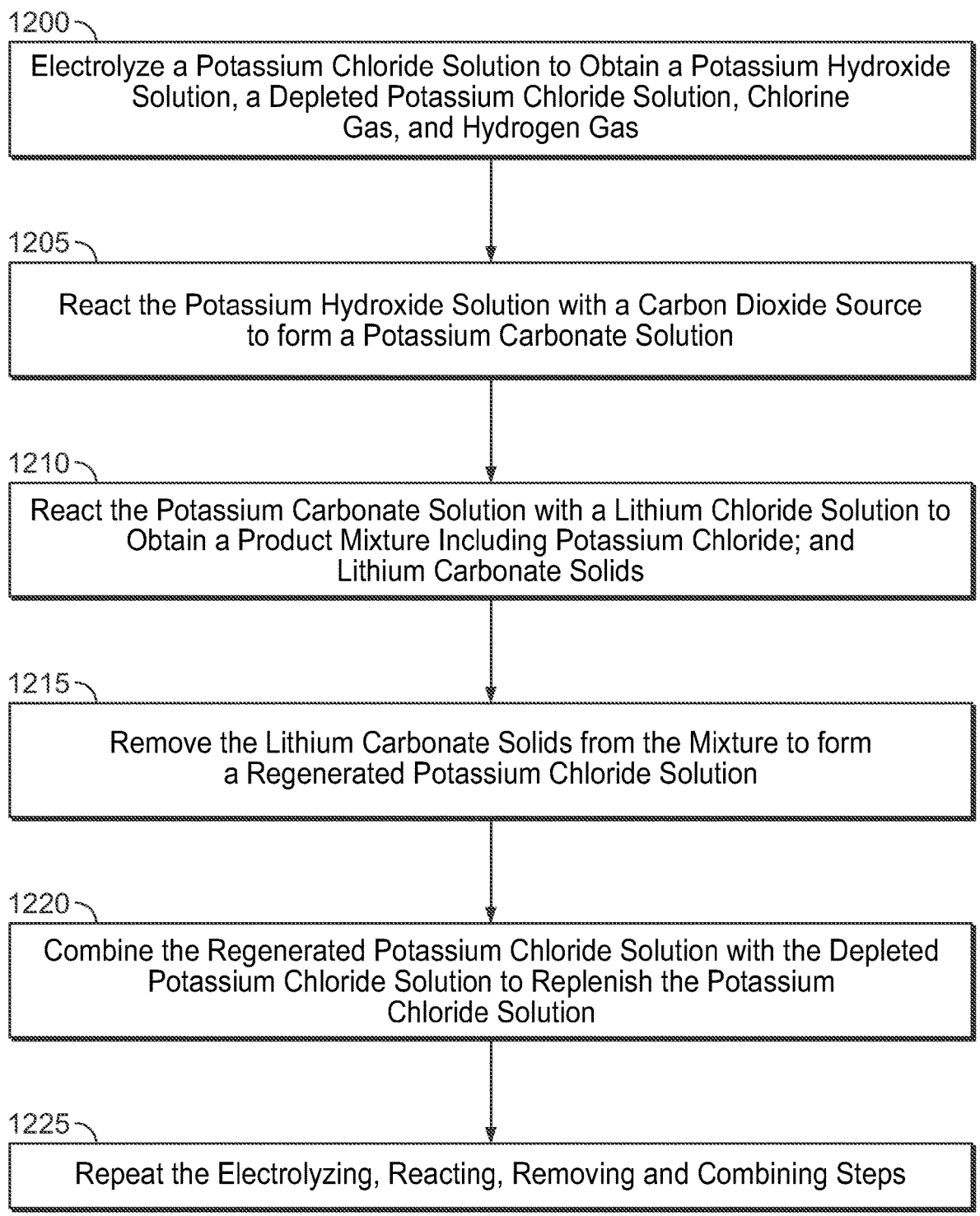

FIG. 12 shows an example of a process for production of lithium carbonate according to aspects of the present disclosure. At operation 1200, the system electrolyzes a potassium chloride solution to obtain a potassium hydroxide solution, a depleted potassium chloride solution, chlorine gas, and hydrogen gas. In some cases, the operations of this step refer to, or may be performed by, an electrolysis cell as described with reference to FIGS. 1-4. At operation 1205, the system reacts the potassium hydroxide solution with a carbon dioxide source to form a potassium carbonate solution. In some cases, the operations of this step refer to, or may be performed by, a reactor as described with reference to FIGS. 1-3. At operation 1210, the system reacts the potassium carbonate solution with a lithium chloride solution to obtain a product mixture including potassium chloride and lithium carbonate solids. In some cases, the operations of this step refer to, or may be performed by, a reactor as described with reference to FIGS. 1-3. At operation 1215, the system removes the lithium carbonate solids from the mixture to form a regenerated potassium chloride solution. In some cases, the operations of this step refer to, or may be performed by, a separator as described with reference to FIG. 3. At operation 1220, the system combines the regenerated potassium chloride solution with the depleted potassium chloride solution to replenish the potassium chloride solution. In some cases, the operations of this step refer to, or may be performed by, a mixer as described with reference to FIG. 3. At operation 1225, the system repeats the electrolyzing, reacting, removing and combining steps.

Figure 13:
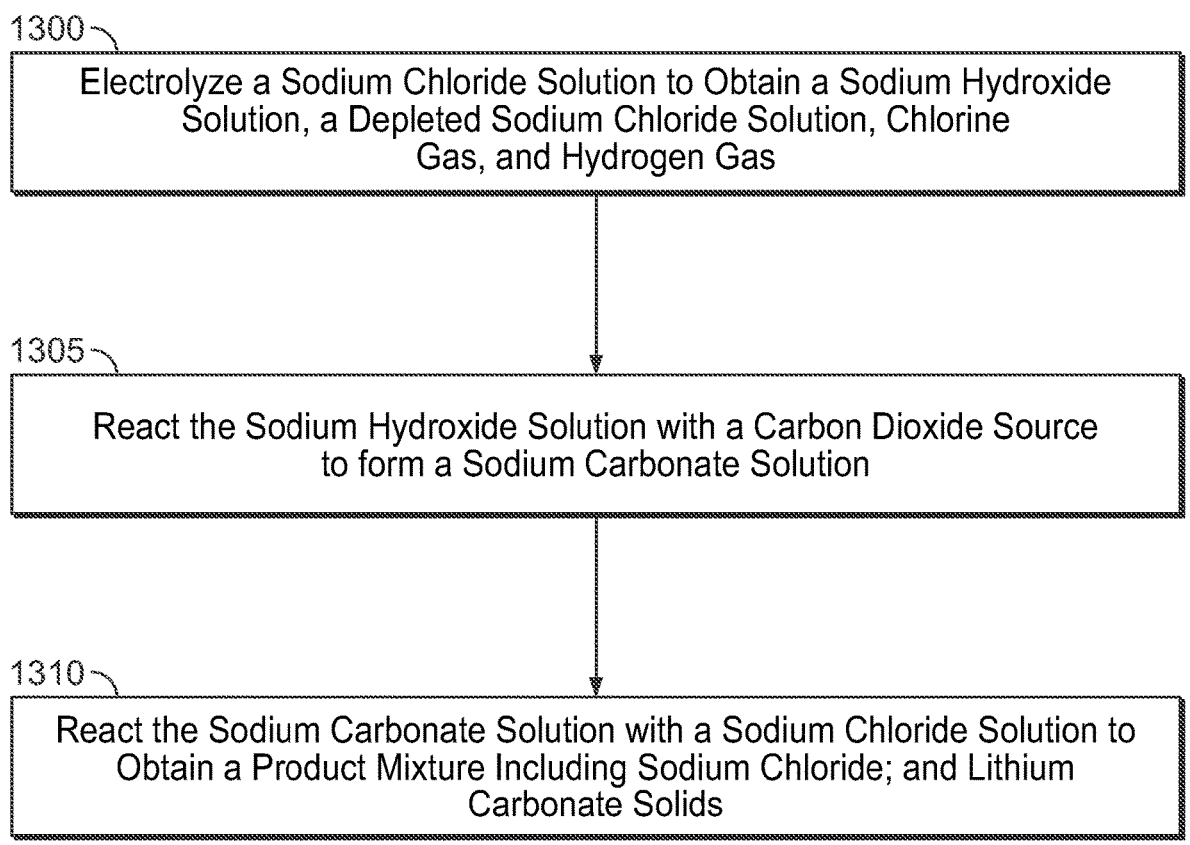

FIG. 13 shows an example of a process for production of lithium carbonate according to aspects of the present disclosure. At operation 1300, the system electrolyzes a sodium chloride solution to obtain a sodium hydroxide solution, a depleted sodium chloride solution, chlorine gas, and hydrogen gas. In some cases, the operations of this step refer to, or may be performed by, an electrolysis cell as described with reference to FIGS. 1-4. At operation 1305, the system reacts the sodium hydroxide solution with a carbon dioxide source to form a sodium carbonate solution. In some cases, the operations of this step refer to, or may be performed by, a reactor as described with reference to FIGS. 1-3. At operation 1310, the system reacts the sodium carbonate solution with a sodium chloride solution to obtain a product mixture including sodium chloride and lithium carbonate solids. In some cases, the operations of this step refer to, or may be performed by, a reactor as described with reference to FIGS. 1-3.

Figure 14:
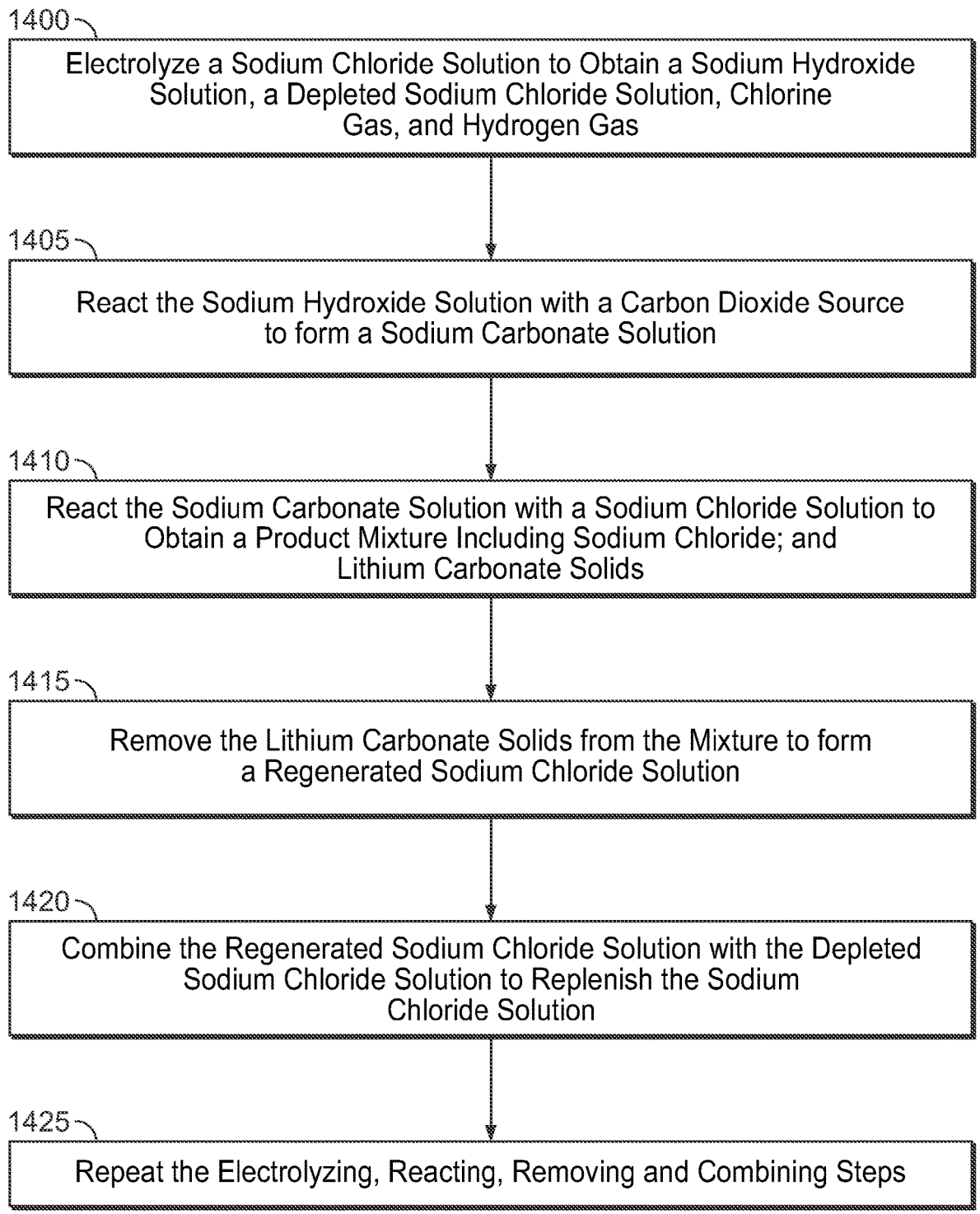

FIG. 14 shows an example of a process for production of lithium carbonate according to aspects of the present disclosure. At operation 1400, the system electrolyzes a sodium chloride solution to obtain a sodium hydroxide solution, a depleted sodium chloride solution, chlorine gas, and hydrogen gas. In some cases, the operations of this step refer to, or may be performed by, an electrolysis cell as described with reference to FIGS. 1-4. At operation 1405, the system reacts the sodium hydroxide solution with a carbon dioxide source to form a sodium carbonate solution. In some cases, the operations of this step refer to, or may be performed by, a reactor as described with reference to FIGS. 1-3. At operation 1410, the system reacts the sodium carbonate solution with a sodium chloride solution to obtain a product mixture including potassium chloride, and lithium carbonate solids. In some cases, the operations of this step refer to, or may be performed by, a reactor as described with reference to FIGS. 1-3. At operation 1415, the system removes the lithium carbonate solids from the mixture to form a regenerated sodium chloride solution. In some cases, the operations of this step refer to, or may be performed by, a separator as described with reference to FIG. 3. At operation 1420, the system combines the regenerated sodium chloride solution with the depleted sodium chloride solution to replenish the sodium chloride solution. In some cases, the operations of this step refer to, or may be performed by, a mixer as described with reference to FIG. 3. At operation 1425, the system repeats the electrolyzing, reacting, removing and combining steps.

Figure 15:
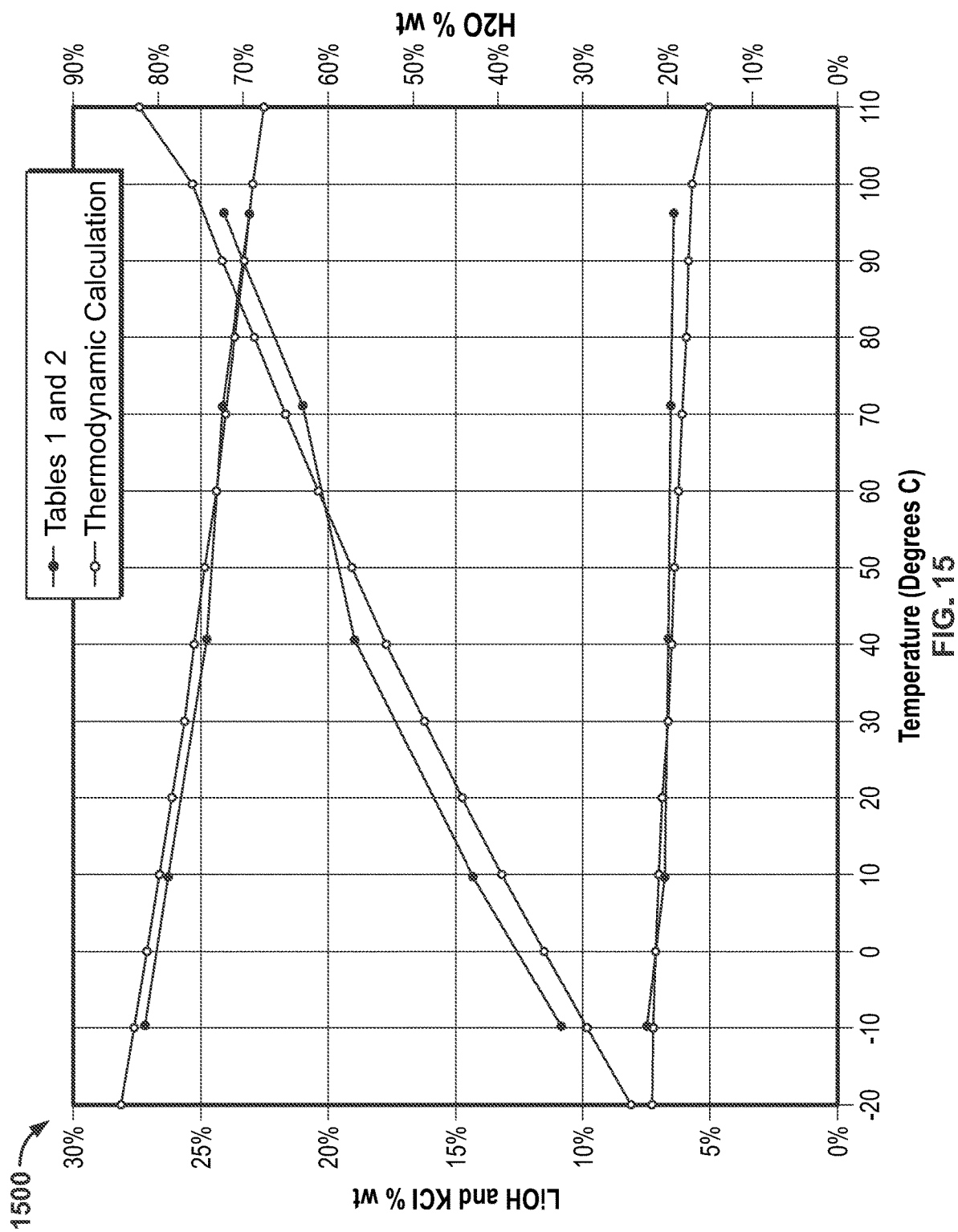
FIG. 15 shows example temperature and weight percentage data from an exemplary reciprocal salt system according to aspects of the present disclosure.

FIG. 15 shows example temperature and weight percentage data from a reciprocal salt system 1500 according to aspects of the present disclosure. Reciprocal salt system 1500 may be an example of, or may include aspects of, the corresponding element described with reference to FIG. 7. The lines represent the eutectic point of saturation of lithium hydroxide as well as potassium chloride at different temperatures. The lines were generated using values from publicly available scientific literature, The graph can be used, in some examples (e.g., Example 3, below), to guide the selective precipitation of lithium hydroxide and potassium chloride in accordance with the present disclosure.

Figure 16:
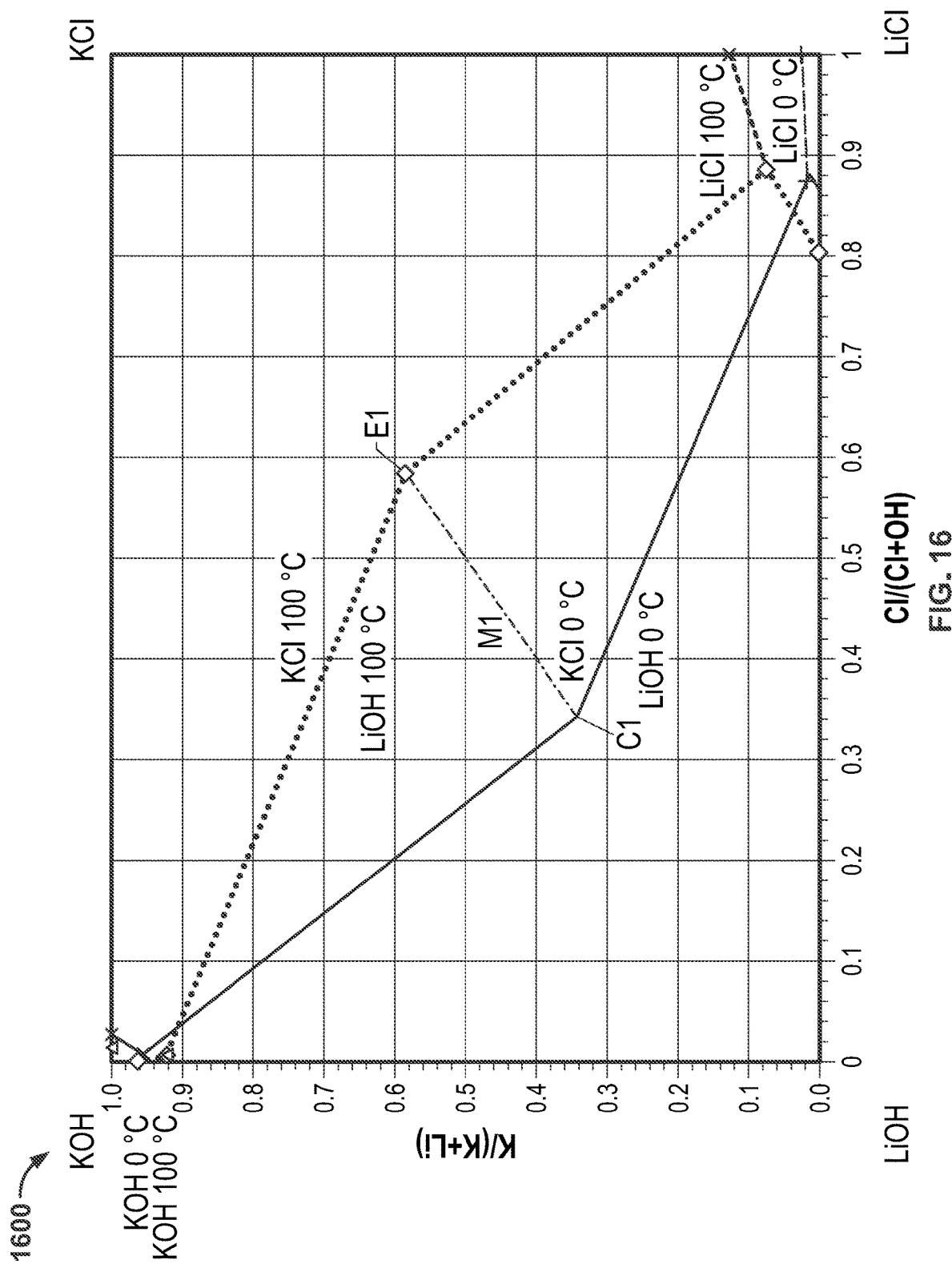
FIG. 16 is a Jänecke diagram of an exemplary reciprocal salt system according to the present disclosure.

FIG. 16 depicts a Jänecke diagram of an exemplary reciprocal salt system according to the present disclosure. A Jänecke diagram is defied in accordance with the definition in "Beyond Discovery," available at https://www.beyond-discovery.org/crystal-growth/473-janecke-diagrams.html, last accessed Jul. 23, 2021. At least the aforementioned section of the "Beyond Discovery" website is incorporated by reference herein in its respective entirety for all purposes.

In the exemplary Jänecke diagram 1600, the corresponding reciprocal salt system may be denoted as: $K^+$, $Li^+$||$Cl^-$+ $H_2O$. The plotted molar ratios in exemplary Jänecke diagram 1600 are K/(K+Li) and Cl/(Cl+OH). In the exemplary Jänecke diagram 1600, the lithium chloride (LiCl) and potassium hydroxide (KOH) are very soluble and are not precipitated in significant amounts. In the exemplary Jänecke diagram 1600, the highest yield can be obtained with a stoichiometric mixture (M1) of Lithium Chloride (LiCl) and Potassium Chloride (KCl). A may be used, but the yield may not be as high.

As shown, mixture M1 can be cooled to 0° C. (C1). During the cooling, a solution of molar composition C1 may be formed. The KCl can be separated and the solution C1 can be evaporated until point E1 at 100° C., where LiOH will be crystalized according to some embodiments. The crystals can be separated. In some implementations, solution E1 may be mixed with M1. The resulting mixture, which would be at a point between E1 and M1, can then be cooled to C1 to form KCl. The evaporating, crystallization, separating, and mixing may, in some implementations, be repeated.

Non-Limiting Example 1: Production of Lithium Hydroxide

A lithium chloride solution having a lithium chloride concentration ranging from 10 wt % to 50 wt % of lithium chloride by weight of the lithium chloride solution is mixed with: (i) a potassium hydroxide solution having a concentration ranging from 10 wt % to 40 wt % of potassium chloride by weight of solution; and (ii) recycled potassium hydroxide solution. The resulting mixture is added to a crystallization reactor to result in a reciprocal salt system. The reciprocal salt system is monitored to maintain the reciprocal salt system at below the saturation point of lithium hydroxide (see, e.g., FIG. 15.)

The reciprocal salt system is cooled to selectively precipitate the potassium chloride. The resulting potassium chloride crystals are separated with either a centrifuge or a belt filter and dissolved in water or brine. The insoluble solids are filtered from the potassium chloride. The resulting solution is treated in an electrolysis cell to produce a depleted potassium chloride solution, chlorine gas, potassium hydroxide solution and hydrogen gas, and to result in the recycled potassium hydroxide solution (ii) described above.

The reciprocal salt system is heated and water is evaporated to selectively precipitate the lithium hydroxide. The evaporative heating is performed until the solution is below the potassium chloride saturation point as shown in FIG. 15. The crystallized lithium hydroxide monohydrate is then separated by a centrifuge. The solid lithium hydroxide monohydrate crystals are dissolved in water. A polish filter is then applied to remove the insoluble solids from the resulting lithium hydroxide solution. The solution is evaporated until purified lithium hydroxide monohydrate crystals were formed. A centrifuge or belt filter is applied to separate and wash the lithium hydroxide monohydrate crystals which can then be dried and packed.

Non-Limiting Example 2: Production of Lithium Carbonate

A potassium carbonate or sodium carbonate solution is obtained by treating potassium chloride or sodium chloride in an electrolysis cell to form a depleted potassium chloride or sodium chloride solution, chlorine gas, hydrogen gas, and a potassium hydroxide or sodium hydroxide solution.

The formed potassium hydroxide or sodium hydroxide solution is reacted with a carbon dioxide source to obtain potassium carbonate or sodium carbonate.

A lithium chloride solution is purified from a brine and reacted with the potassium carbonate or sodium carbonate solution at a temperature ranging from 60° C. to 120° C. to form a product mixture comprising lithium carbonate solids and potassium or sodium chloride. The lithium carbonate solids are separated, washed, dried, and collected.

The potassium chloride or sodium chloride solution is pH adjusted to remove the dissolved carbonate. The potassium chloride or sodium chloride solution is then concentrated in an evaporator and combined with the depleted potassium chloride or sodium chloride solution so as to replenish the potassium chloride or sodium chloride solution.

Non-Limiting Example 3: Relative Solubility Test of Lithium Hydroxide and Potassium Chloride A relative solubility test was performed with the following experimental set-up:

A three-liter (3 L) glass-jacketed crystallizer reactor 1700 (shown in FIG. 17 at −9.8° C.), which included an overhead mixer, impeller, and baffles.

A heating and chilling system connected to the glass-jacketed crystallizer reactor 1700.

A thermocouple and a temperature-monitoring controller.

A vacuum flask, Buchner funnel, and lab-scale centrifuge

The following experimental procedure was followed:

A saturated solution of LiOH and KCl was prepared with initial target weight percentages of 12 wt % and 32 wt %, respectively, at a temperature exceeding 95° C.

The saturated solution was held for 1 hour at T>95° C. and was decreased to 70° C., 40° C., 10° C. and −10° C.

The saturated solution was held at each temperature for 1 hour and sampled according to the following procedure:

Solid and solution samples were taken at T>95° C., 40° C. and −10° C. (initial, intermediate, and final) by dewatering using a lab-scale centrifuge and a 28 μm filter medium (polypropylene fabric).

Masses of the collected filtrate and crystals were recorded.

Samples at 70° C. and 10° C. were then taken according to the above steps.

Figure 18:
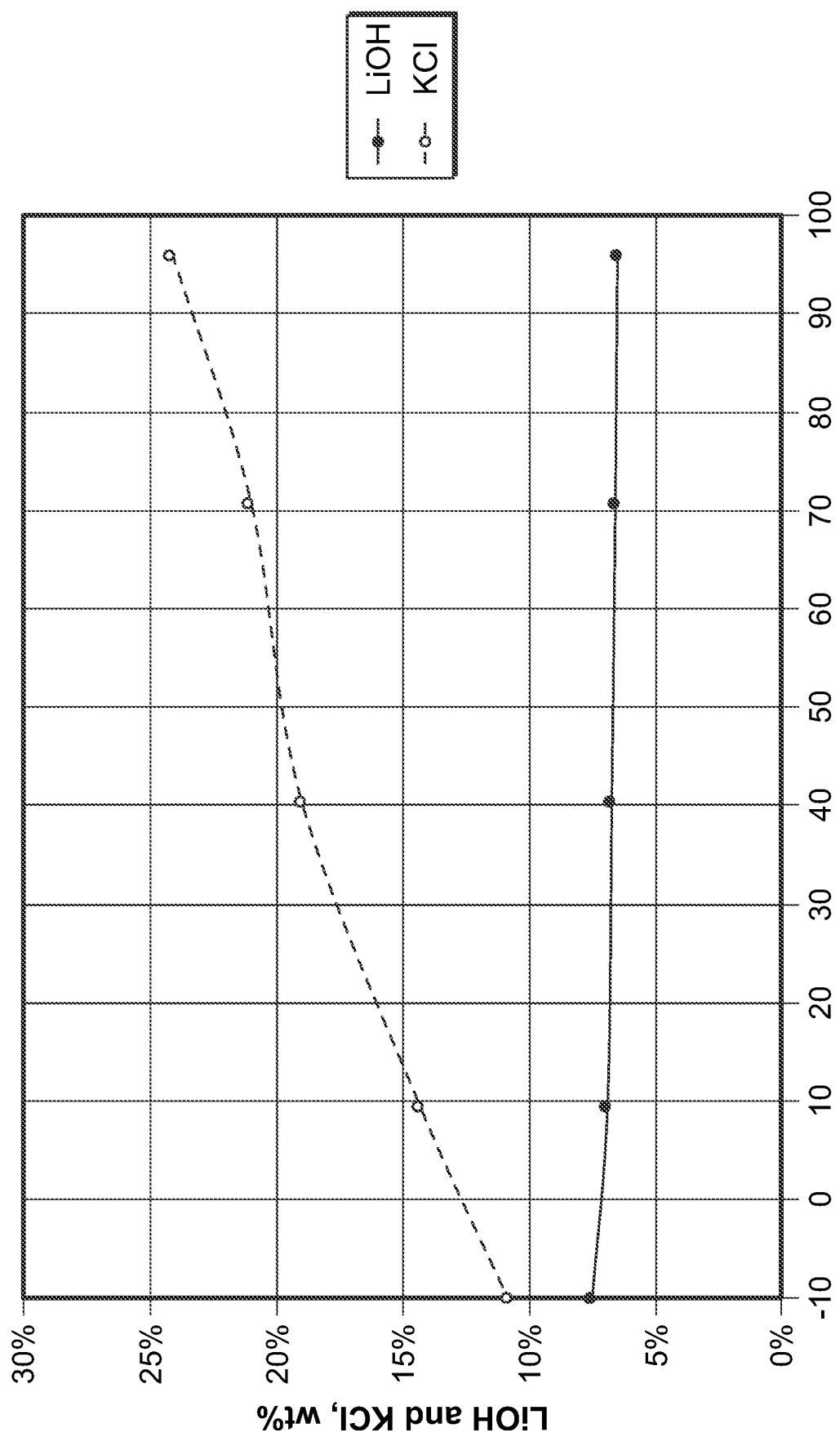
FIG. 18 shows exemplary results of a relative solubility test of lithium hydroxide and potassium chloride at different temperatures according to aspects of the present disclosure.

FIG. 18 shows the results of the exemplary relative solubility test of the present example. The weight percentages shown correspond to weight percentages in the aqueous phase (i.e., "in solution.") As shown, potassium chloride can be selectively precipitated at lower temperatures, as indicated by the lower weight percentage of potassium chloride in the aqueous phase at lower temperatures. Conversely, lithium hydroxide can be selectively precipitated at higher temperatures, as indicated by the lower weight percentage of lithium hydroxide in the aqueous phase at highest temperatures.

Additional results are also shown in Tables 1-2 below.

TABLE 1

Results of Relative Solubility Test

| Time h | Temp. °C. | Time after hold h | Temp. after hold °C. | Filtrate mass g | Crystal mass g | Li in solution g/kg | [Li] in crystal g/kg |
|---|---|---|---|---|---|---|---|
| 9:00 | 96.0 | 10:00 | 96.1 | 275.0 | 72.5 | 18.79 | 83.90 |
| 11:15 | 70.4 | 12:15 | 71.1 | | | 19.03 | |
| 13:05 | 40.7 | 14:05 | 40.7 | 249.9 | 76.8 | 19.43 | 58.07 |
| 14:45 | 10.7 | 15:45 | 9.7 | | | 19.91 | |
| 17:00 | −9.3 | 18:00 | −9.8 | 1415.2 | 660.7 | 21.64 | 47.68 |

TABLE 2

Results of Relative Solubility Test (cont'd)

| Time h | Temp. °C. | Time after hold h | Temp. after hold °C. | [K] in solution g/kg | [K] in crystal g/kg | LiOH wt % | KCl wt % | H₂O wt % |
|---|---|---|---|---|---|---|---|---|
| 9:00 | 96.0 | 10:00 | 96.1 | 126.41 | 204.17 | 6.5% | 24% | 69% |
| 11:15 | 70.4 | 12:15 | 71.1 | 110.15 | | 6.6% | 21% | 72% |
| 13:05 | 40.7 | 14:05 | 40.7 | 99.67 | 248.22 | 6.7% | 19% | 74% |
| 14:45 | 10.7 | 15:45 | 9.7 | 75.17 | | 6.9% | 14% | 79% |
| 17:00 | −9.3 | 18:00 | −9.8 | 57.06 | 300.85 | 7.5% | 11% | 82% |

The above results show that lithium hydroxide and potassium chloride can be selectively precipitated from a reciprocal salt system in accordance with the present disclosure.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein. Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

Any feature or element that is positively identified in this description may also be specifically excluded as a feature or element of an embodiment of the present disclosure as defined in the claims.

As used herein, the term "consisting essentially of" limits the scope of a specific claim to the specified materials or steps and those that do not materially affect the basic and novel characteristic or characteristics of the specific claim.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
    reacting a potassium hydroxide solution with a lithium chloride solution to form a reciprocal salt system comprising:
        potassium hydroxide,
        lithium chloride,
        potassium chloride,
        lithium hydroxide; and
        water; and
    selectively crystalizing the potassium chloride and selectively precipitating the lithium hydroxide from the reciprocal salt system to form:
        lithium hydroxide crystals, and
        potassium chloride crystals;
    where the potassium chloride crystals are selectively crystalized during a cooling stage.

2. The method of claim 1, where the potassium hydroxide solution is obtained by electrolyzing a potassium chloride solution.

3. The method of claim 2, where electrolyzing the potassium chloride solution further results in:
    a potassium hydroxide solution,
    a depleted potassium chloride solution,
    chlorine gas, and
    hydrogen gas.

4. The method of claim 2, wherein the electrolyzing is performed using membrane electrolysis.

5. The method of claim 2, wherein the electrolyzing is performed using chlor-alkali electrolysis.

6. The method of claim 3, further comprising reacting the hydrogen gas with the chlorine gas to produce hydrochloric acid.

7. The method of claim 1, further comprising obtaining the lithium chloride solution from a naturally occurring brine.

8. The method of claim 1, further comprising obtaining the lithium chloride solution from a mineral source.

9. The method of claim 1, wherein the lithium hydroxide comprises lithium hydroxide monohydrate.

10. The method of claim 1, further comprising purifying the lithium hydroxide crystals.

11. The method of claim 10, where purifying the lithium hydroxide crystals comprises:
    separating the lithium hydroxide crystals from the reciprocal salt system
    dissolving the lithium hydroxide crystals in water or a brine to form a lithium hydroxide solution;
    separating insoluble solids from the lithium hydroxide solution; and
    evaporating water from the lithium hydroxide solution to recrystallize the lithium hydroxide crystals.

12. The method of claim 1, where the reacting, the selectively crystalizing, and the selectively precipitating are performed simultaneously, sequentially, or a combination thereof.

13. The method of claim 1, further comprising separating the lithium hydroxide crystals, the potassium chloride crystals, or a combination thereof from the reciprocal salt system.

14. The method of claim 1, where the lithium hydroxide crystals are selectively precipitated during an evaporative heating stage.

15. A method comprising:
    selectively crystalizing potassium chloride and selectively precipitating lithium hydroxide from a reciprocal salt system to form:
        lithium hydroxide crystals, and
        potassium chloride crystals;
    where the potassium chloride crystals are selectively crystalized during a cooling stage.

16. The method of claim 15, where the reciprocal salt system is obtained by reacting a potassium hydroxide solution with a lithium chloride solution.

17. A system comprising:
    at least one reactor, where the at least one reactor is configured to react a potassium hydroxide solution with a lithium chloride solution to form a reciprocal salt system comprising:
        potassium hydroxide,
        lithium chloride,
        potassium chloride,
        lithium hydroxide; and
        water; and
    at least one crystallizer, where the at least one crystallizer is configured to selectively crystalize the potassium chloride and selectively precipitate the lithium hydroxide from the reciprocal salt system to form:
        lithium hydroxide crystals, and
        potassium chloride crystals;
    where the at least one crystallizer is further configured to selectively crystalize the potassium chloride crystals during a cooling stage.

18. The system of claim 17, further comprising:
    at least one electrolysis cell, where the at least one electrolysis cell is configured to electrolyze the potassium chloride solution to obtain:
        a potassium hydroxide solution,
        a depleted potassium chloride solution,
        chlorine gas, and
        hydrogen gas.

19. The system of claim 17, further comprising at least one separator, where the at least one separator and the at least one crystallizer are a single device, where the single device is a crystallization reactor.

20. The system of claim 17 further comprising at least one separator, where the at least one separator and the at least one crystallizer are separate devices.

* * * * *